US012786566B2

(12) United States Patent
Kanda

(10) Patent No.: US 12,786,566 B2
(45) Date of Patent: Nov. 3, 2026

(54) CONTROL APPARATUS, IMAGE PICKUP APPARATUS, CONTROL METHOD, AND STORAGE MEDIUM

(71) Applicant: CANON KABUSHIKI KAISHA, Tokyo (JP)

(72) Inventor: Akihiko Kanda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/203,900

(22) Filed: May 9, 2025

(65) Prior Publication Data

US 2025/0373944 A1 Dec. 4, 2025

(30) Foreign Application Priority Data

May 29, 2024 (JP) ................................ 2024-087264

(51) Int. Cl.
*H04N 23/67* (2023.01)

(52) U.S. Cl.
CPC ......... *H04N 23/675* (2023.01); *H04N 23/672* (2023.01); *H04N 23/673* (2023.01)

(58) Field of Classification Search
CPC ........................... H04N 23/675; H04N 23/672
See application file for complete search history.

(56) References Cited

U.S. PATENT DOCUMENTS

2017/0214845 A1* 7/2017 Ohara .................. H04N 25/704
2019/0014267 A1* 1/2019 Kunieda .............. H04N 23/672
2020/0259995 A1* 8/2020 Ito ....................... G06F 3/04817
2024/0284047 A1* 8/2024 Hamano .............. H04N 23/675

FOREIGN PATENT DOCUMENTS

JP 2011237215 A 11/2011
JP 2022129931 A 9/2022
JP 2023081041 A 6/2023
WO 2017135276 A 8/2017
WO 2020195073 A1 10/2020

* cited by examiner

*Primary Examiner* — Cynthia Calderon
(74) *Attorney, Agent, or Firm* — Cowan, Liebowitz & Latman, P.C.

(57) ABSTRACT

A control apparatus includes at least one processor that executes instructions to perform a first focus detection based on a first signal obtained from a pair of pixels arranged on an image sensor in a first direction, perform a second focus detection based on a second signal obtained from a pair of pixels arranged on the image sensor in a second direction different from the first direction, detect an object based on an image signal obtained from the image sensor, determine a first focus detecting area group for the first focus detection and a second focus detecting area group for the second focus detection, and change at least one of the first focus detecting area group and the second focus detecting area group according to an object detection result.

15 Claims, 22 Drawing Sheets

CONTROL APPARATUS, IMAGE PICKUP APPARATUS, CONTROL METHOD, AND STORAGE MEDIUM

BACKGROUND

Technical Field

The present disclosure relates to a control apparatus, an image pickup apparatus, a control method, and a storage medium.

Description of Related Art

Japanese Patent Application Laid-Open No. 2011-237215 discloses an image pickup apparatus which performs a focus detection from different focus detecting directions by a phase-difference detecting method using two image sensors. Japanese Patent Application Laid-Open No. 2011-237215 discloses a method for obtaining a defocus amount by combining defocus amounts in different focus detecting directions into one.

Japanese Patent Application Laid-Open No. 2011-237215 is silent about the way of placing a defocus map, which is a group of defocus amounts of a plurality of areas, relative to an object. Thus, the image pickup apparatus disclosed in Japanese Patent Application Laid-Open No. 2011-237215 may not be able to perform proper focus detection according to an object.

SUMMARY

A control apparatus according to one aspect of the disclosure includes at least one processor that executes instructions to perform a first focus detection based on a first signal obtained from a pair of pixels arranged on an image sensor in a first direction, perform a second focus detection based on a second signal obtained from a pair of pixels arranged on the image sensor in a second direction different from the first direction, detect an object based on an image signal obtained from the image sensor, determine a first focus detecting area group for the first focus detection and a second focus detecting area group for the second focus detection, and change at least one of the first focus detecting area group and the second focus detecting area group according to an object detection result. An image pickup apparatus having the above control apparatus also constitutes another aspect of the disclosure. A control method corresponding to the above control apparatus also constitutes another aspect of the disclosure. A storage medium storing a program that causes a computer to executes the above control method also constitutes another aspect of the disclosure.

Further features of various embodiments of the disclosure will become apparent from the following description of embodiments with reference to the attached drawings.

DETAILED DESCRIPTION

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor)

components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

Imaging System 10

Figure 1:
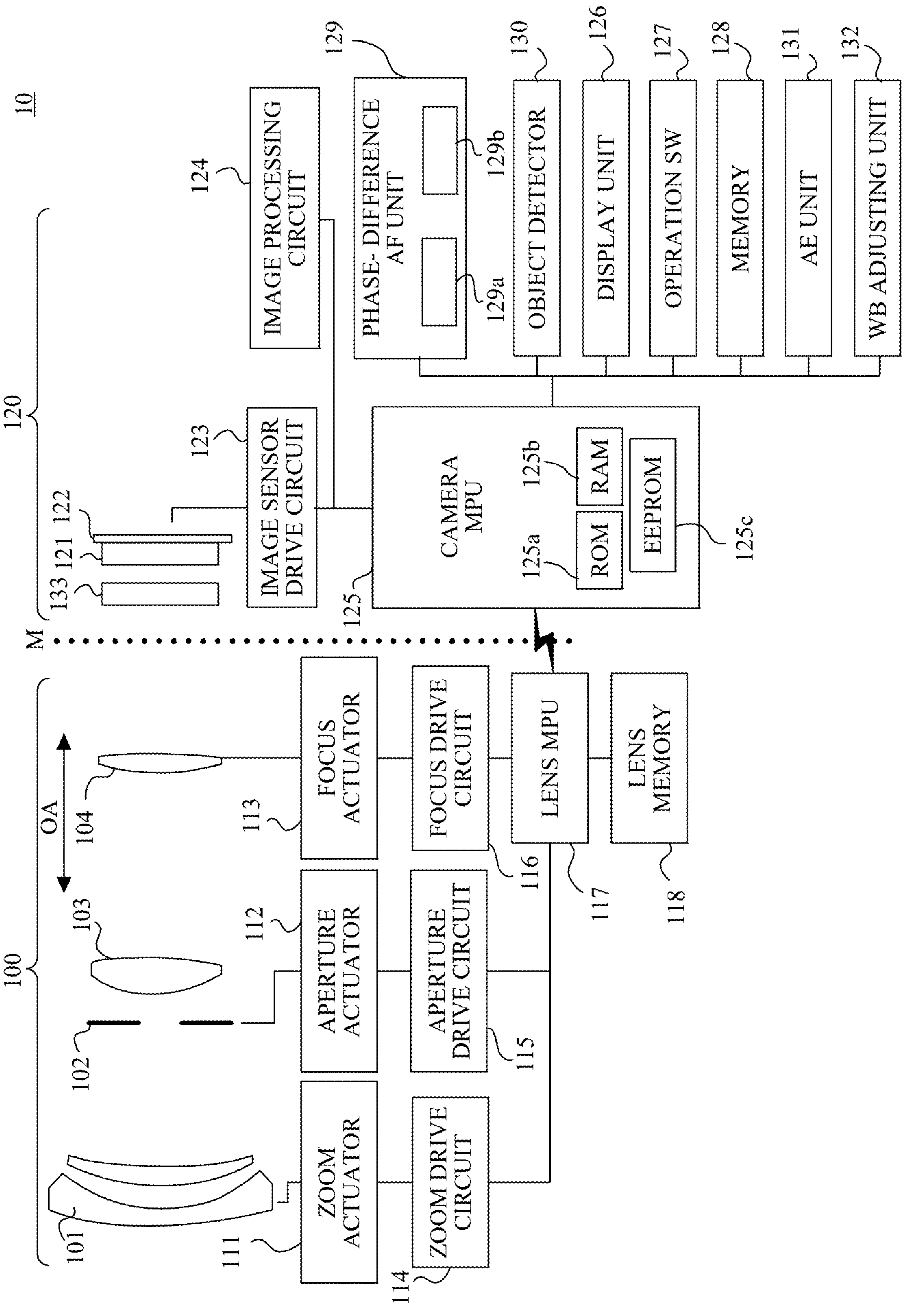
FIG. 1 is a block diagram of an image pickup apparatus according to this embodiment.

FIG. 1 is a block diagram of an imaging system 10 according to this embodiment. The imaging system 10 includes a camera body (image pickup apparatus) 120 as a digital camera, and a lens unit (interchangeable lens) 100. The lens unit 100 is attached to and detachable from the camera body 120 as a digital camera via a mount M indicated by a dotted line in FIG. 1. This embodiment is applicable to an image pickup apparatus in which the camera body is integrated with a lens unit. This embodiment is not limited to the digital camera but may be applicable to another image pickup apparatus such as a video camera.

The lens unit 100 includes an imaging optical system and a drive/control system. The imaging optical system includes a first lens unit 101, an aperture stop (diaphragm) 102, a second lens unit 103, and a focus lens unit (simply referred to as focus lens hereinafter) 104 as a focusing element. The imaging optical system receives light from an object and forms an object image (optical image).

The first lens unit 101 is disposed closest to an object (the foremost side) in the imaging optical system, and is movable in an optical axis direction in which an optical axis OA extends. The aperture stop 102 adjusts a light amount by changing its aperture diameter, and functions as a shutter that controls the exposure time in capturing a still image. The aperture stop 102 and the second lens unit 103 are movable together in the optical axis direction, and achieve zooming in association with the movement of the first lens unit 101. The focus lens 104 moves in the optical axis direction to perform focusing. Focus control (autofocus (AF) control) is provided by controlling the position of the focus lens 104 in the optical axis direction according to a focus detection result, which will be described below.

The lens drive/control system includes a zoom actuator 111, an aperture actuator 112, a focus actuator 113, a zoom drive circuit 114, an aperture drive circuit 115, a focus drive circuit 116, a lens MPU (processor) 117, and a lens memory 118. During zooming, the zoom drive circuit 114 drives the first lens unit 101 and the second lens unit 103 in the optical axis direction by driving the zoom actuator 111. The aperture drive circuit 115 drives the aperture actuator 112 to operate the aperture stop 102 for an aperture operation or a shutter operation.

During focusing, the focus drive circuit 116 moves the focus lens 104 in the optical axis direction by driving the focus actuator 113. The focus drive circuit 116 has a function as a position detector configured to detect the current position of the focus lens 104 (referred to as a focus position hereinafter).

The lens MPU 117 is a computer that performs calculations and processing relating to the lens unit 100, and controls the zoom drive circuit 114, the aperture drive circuit 115, and the focus drive circuit 116. The lens MPU 117 is connected communicably to a camera MPU (determining unit, control unit, processor) 125 through a communication terminal in the mount M and communicates commands and data with the camera MPU 125. For example, the lens MPU 117 transmits lens information to the camera MPU 125 according to a request from the camera MPU 125. This lens information includes information about a focus position, a position in the optical axis direction and a diameter of an exit pupil of the imaging optical system, and a position in the optical axis direction and a diameter of a lens frame that limits a light beam from the exit pupil.

The lens MPU 117 controls the zoom drive circuit 114, the aperture drive circuit 115, and the focus drive circuit 116 according to a request from the camera MPU 125. The lens memory 118 stores optical information necessary for AF. The camera MPU 125 controls the operation of lens unit 100 by executing programs stored in built-in nonvolatile memory and lens memory 118.

The camera body 120 includes an optical low-pass filter 121, an image sensor 122, an image processing circuit 124, and a drive/control system. The optical low-pass filter 121 is provided to reduce false colors and moiré.

The image sensor 122 includes a Complementary Metal-Oxide-Semiconductor (CMOS) sensor and its peripheral circuits. The image sensor 122 photoelectrically converts an object image (optical image) formed by an imaging optical system, and outputs an imaging signal and a pair of focus detecting signals (two-image signals). In the image sensor 122, a plurality of imaging pixels of m pixels in the horizontal direction and n pixels in the vertical direction (m and n are integers of 2 or more) are arranged. Each imaging pixel includes a pair of focus detecting pixels, as will be described below, and has a pupil division function that allows focus detection using a phase-difference detecting method.

The drive/control system has an image sensor drive circuit 123, a shutter 133, an image processing circuit 124, the camera MPU 125, a display unit 126, an operation switch (SW) 127, and the memory 128. The drive/control system further includes a phase-difference AF unit (focus detector) 129, an object detector 130, an auto-exposure (AE) unit 131, and a white balance (WB) adjusting unit 132. In this embodiment, for example, the camera MPU 125, the phase-difference AF unit 129, and the object detector 130 configure a control apparatus.

The image sensor drive circuit 123 controls charge accumulation and signal readout in the image sensor 122, and also A/D-converts the imaging signal and the pair of focus detecting signals output from the image sensor 122, and outputs the A/D-converted result to the image processing circuit 124 and camera MPU 125. The image processing circuit 124 performs image processing such as γ conversion, color interpolation processing, and compression encoding processing for the digital imaging signal from the image sensor drive circuit 123 to generate image data.

The camera MPU 125 is a computer that executes calculations and processing relating to the camera body 120, and controls the image sensor drive circuit 123, the image processing circuit 124, the display unit 126, the phase-difference AF unit 129, the object detector 130, and the AE unit 131 and the WB adjustment unit 132. The camera MPU 125 is communicably connected to the lens MPU 117 through the communication terminal of the mount M, and communicates commands and data with the lens MPU 117. For example, the camera MPU 125 requests the lens MPU

117 for lens information and optical information, or requests the lens MPU 117 to drive the first lens unit 101, the focus lens 104 or the aperture stop 102. The camera MPU 125 receives lens information and optical information transmitted from lens MPU 117.

The camera MPU 125 includes a ROM 125*a* that stores a variety of programs, a RAM 125*b* that stores variables, and an EEPROM 125*c* that stores a variety of parameters. The camera MPU 125 executes various processing including AF processing, which will be described below, according to programs stored in the ROM 125*a*. The camera MPU 125 generates two-image data from the pair of digital focus detecting signals from the image sensor drive circuit 123 and outputs it to the phase-difference AF unit 129.

The shutter 133 has a focal plane shutter structure, and drives the focal plane shutter according to a command from a shutter drive circuit built into the shutter 133 based on an instruction from the camera MPU 125. The shutter 133 shields light to the image sensor 122 while a signal from the image sensor 122 is being read out. While exposure is being performed, the focal plane shutter is opened and an imaging light beam is guided to the image sensor 122.

The display unit 126 includes an LCD or the like, and displays information regarding an imaging mode, a preview image before imaging, a confirmation image after imaging, a focus state, etc. The operation SW 127 includes a power switch, a release (imaging instruction) switch, a zoom switch, an imaging mode selection switch, and the like. The memory 128 is a flash memory that is removably attached to the camera body 120, and records images for recording obtained by imaging.

The phase-difference AF unit 129 performs focus detection using two-image data generated by the camera MPU 125. The image sensor 122 photoelectrically converts a pair of optical images formed by light beams that have passed through different pairs of pupil regions (partial pupil regions) in the exit pupil of the imaging optical system, and outputs a pair of focus detecting signals. The phase-difference AF unit 129 performs a correlation calculation for the two-image data generated from the pair of focus detecting signals by the camera MPU 125 to calculate an image shift amount as a phase difference between them, and calculates (acquires) a defocus amount as information regarding the focus from the image shift amount. The camera MPU 125 calculates a drive amount of the focus lens 104 based on the defocus amount calculated by the phase-difference AF unit 129, and transmits a focus control instruction including the drive amount to the lens MPU 117. The phase-difference AF unit 129 as a focus detector sets the arrangement of areas in which focus detection is performed, as will be described in detail later.

Thus, this embodiment performs image-plane phase-difference AF using the output of the image sensor 122, without using a dedicated focus-detecting AF sensor. In this embodiment, the phase-difference AF unit 129 includes an acquiring unit 129*a* configured to acquire two-image data and a calculator 129*b* configured to calculate a defocus amount. At least one of the acquiring unit 129*a* and the calculator 129*b* may be provided in the camera MPU 125.

The object detector 130 detects an object based on an image signal obtained from the image sensor 122. The object detector 130 also performs object detection using dictionary data generated by machine learning. In this embodiment, the object detector 130 uses dictionary data for each object in order to detect multiple types of objects. Each dictionary data is, for example, data in which the characteristics of the corresponding object are registered. The object detector 130 performs object detection while sequentially switching between dictionary data for each object. The dictionary data for each object is stored in a dictionary data memory (ROM 125*a* in the camera MPU 125). Therefore, a plurality of dictionary data are stored in the dictionary data memory. The camera MPU 125 determines which dictionary data from the plurality of dictionary data to use for object detection based on the object priority set in advance and the settings of the image pickup apparatus.

The AE unit 131 performs AE control by performing photometry (light metering) using image data for AE obtained from the image processing circuit 124. More specifically, the AE unit 131 acquires luminance information on image data for AE, and calculates an F-number (aperture value), a shutter speed, and ISO speed as an imaging condition from a difference between the exposure amount acquired from the luminance information and the preset exposure amount. The AE unit 131 performs AE by controlling the aperture value, shutter speed, and ISO speed to the calculated values.

The WB adjustment unit 132 calculates the WB of the image data for WB adjustment obtained from the image processing circuit 124, and adjusts the WB by adjusting RGB color weights according to a difference between the calculated WB and a predetermined proper WB.

The camera MPU 125 can select an image height range for the phase-difference AF, AE, and WB adjustment according to a position, size, and the like of an object detected by the object detector 130.

Image Sensor 122

Figure 2A:
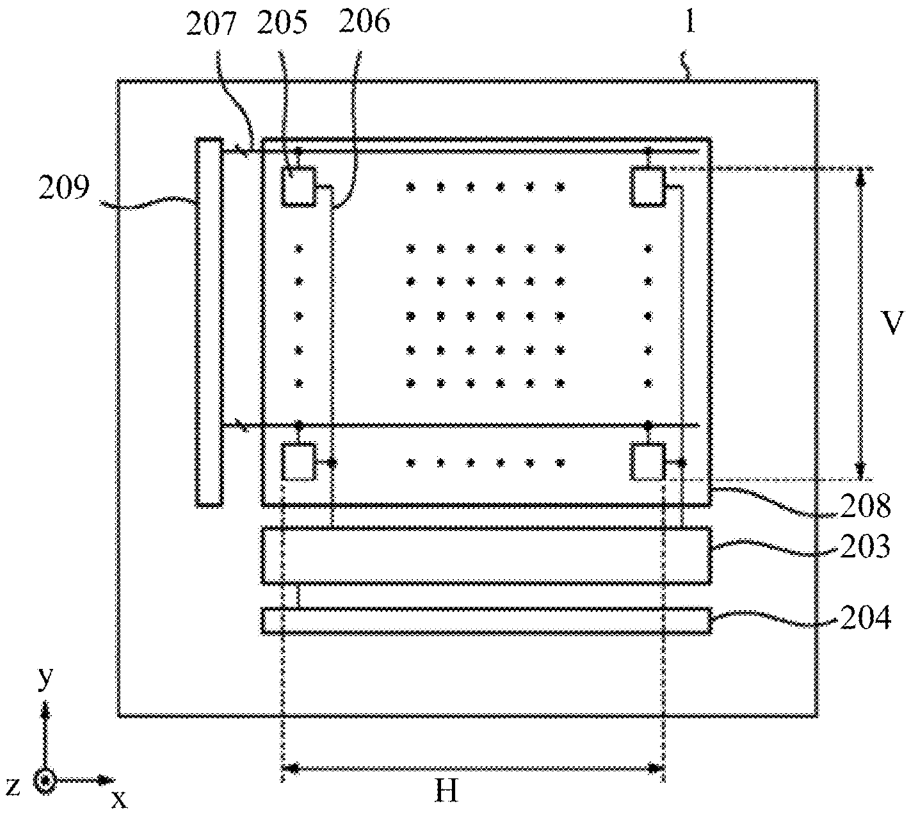
FIG. 2A is a schematic diagram of a pixel arrangement of an image sensor according to this embodiment.
Figure 2B:
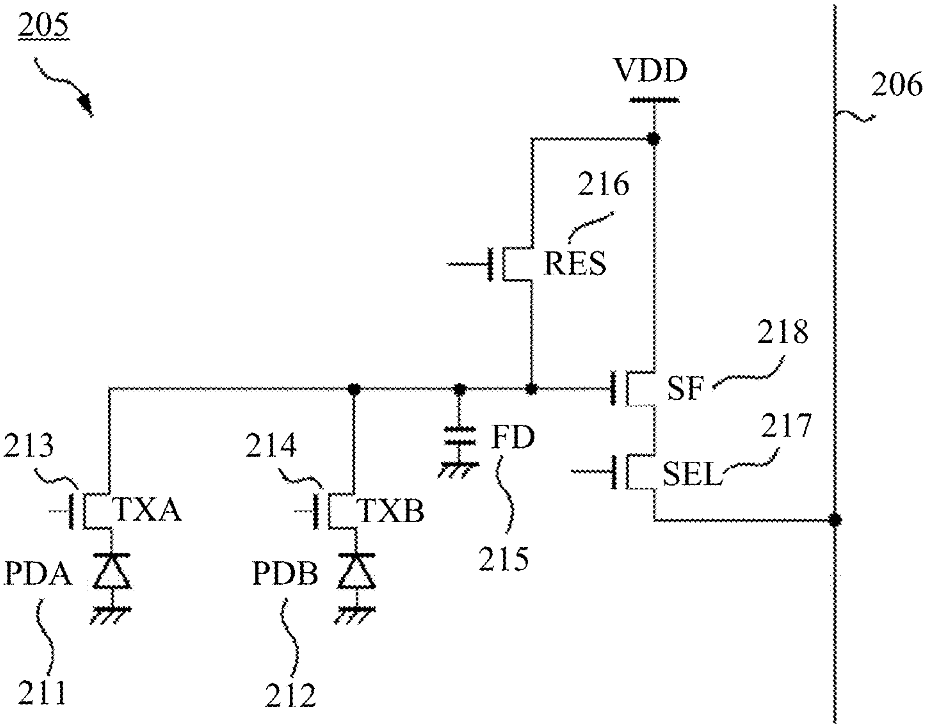
FIG. 2B is an equivalent circuit diagram of a pixel of the image sensor according to this embodiment.
Figure 2C:
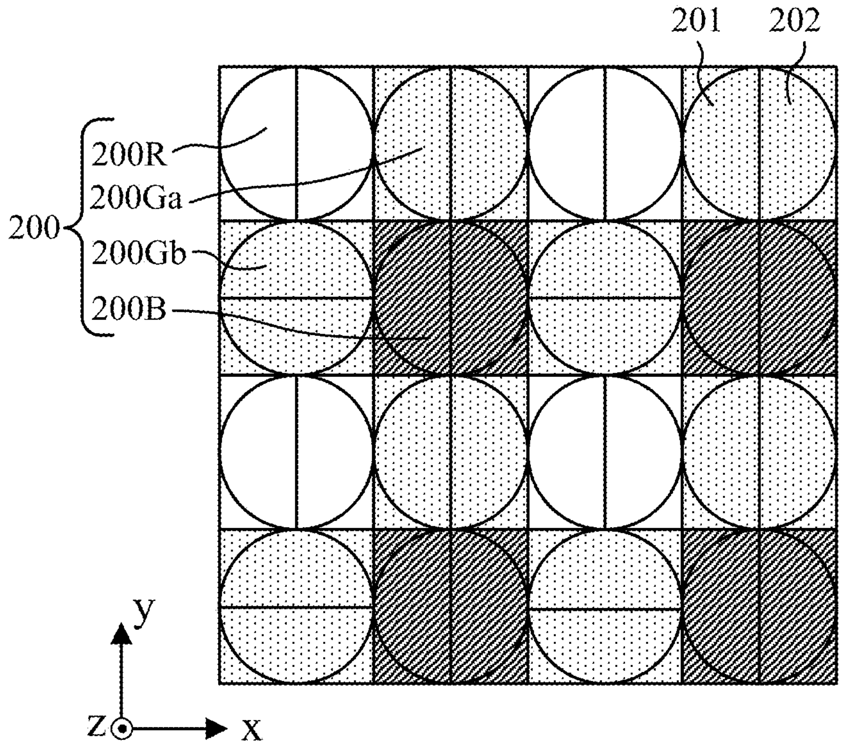
FIG. 2C illustrates a pixel arrangement of the image sensor according to this embodiment.

FIGS. 2A, 2B, and 2C illustrate pixel arrays on an imaging surface of the image sensor 122 as a two-dimensional CMOS sensor in this embodiment. FIG. 2A is a schematic diagram of an example of the overall configuration of the image sensor 122 illustrated in FIG. 1. The image sensor 122 includes a pixel array unit 208, a vertical selection circuit 209, a column circuit 203, and a horizontal selection circuit 204.

A plurality of pixels 205 are arranged in a matrix in the pixel array unit 208. When the output of the vertical selection circuit 209 is input to the pixels 205 via a pixel drive wiring group 207, pixel signals of the pixels 205 in a row selected by the vertical selection circuit 209 are read out to the column circuit 203 via the output signal line 206 on a row-by-row basis. It is possible to provide one output signal line 206 for each pixel column or for each plurality of pixel columns, or a plurality of output signal lines 206 for each pixel column. Signals read out in parallel are input to the column circuit 203 via the plurality of output signal lines 206, and the column circuit 203 performs processing such as signal amplification, noise removal, and A/D conversion, and stores the processed signals. The horizontal selection circuit 204 sequentially, randomly, or simultaneously selects the signals held in the column circuit 203, and the selected signals are output to the outside of the image sensor 122 via a horizontal output line and an output unit (not illustrated).

Thus, the operation of outputting pixel signals of the row selected by the vertical selection circuit 209 to the outside of the image sensor 122 is sequentially performed while the row selected by the vertical selection circuit 209 is changed, whereby a two-dimensional image signal or phase difference signal can be read out from the image sensor 122.

FIG. 2B is an equivalent circuit diagram of a pixel 205 in this embodiment. Each pixel 205 has two photodiodes (PDA 211, PDB 212) that are photoelectric converters. A signal charge generated by the photoelectric conversion by the PDA 211 in accordance with an incident light amount and accumulated is transferred to a floating diffusion portion (FD) 215 constituting a charge accumulator via a transfer switch (TXA) 213. A signal change generated by the photoelectric conversion by the PDB 212 in accordance with an incident light amount and accumulated is transferred to the FD 215 via a transfer switch (TXB) 214. A reset switch (RES) 216, when turned on, resets the FD 215 to the voltage of a constant voltage source VDD. The PDA 211 and the PDB 212 can be reset by turning on the RES 216, the TXA 213, and the TXB 214 simultaneously.

When a selection switch (SEL) 217 for selecting a pixel is turned on, an amplification transistor (SF) 218 converts the signal charge accumulated in the FD 215 into a voltage, and the converted signal voltage is output from the pixel to the output signal line 206. Each of the gates of TXA213, TXB214, RES216, and SEL217 is connected to pixel drive wiring group 207 and controlled by vertical selection circuit 209.

In the following description of this embodiment, the signal charge accumulated in the photoelectric converter is electrons, the photoelectric converter is formed of an N-type semiconductor and separated by a P-type semiconductor, but the signal charge may be holes, the photoelectric converter may be formed of a P-type semiconductor and separated by an N-type semiconductor.

A description will now be given of an operation of reading out signal charge from the PDA 211 and PDB 212 a predetermined charge accumulation time after the PDA 211 and PDB 212 are reset in a pixel having the above configuration. First, the SEL 217 of the row selected by the vertical selection circuit 209 is turned on, and the source of the SF 218 is connected to the output signal line 206, and the output signal line 206 is in a state in which a voltage corresponding to the voltage of the FD 215 is read out. Next, the RES 216 is turned on/off, and the potential of the FD 215 is reset. Thereafter, the system waits until the output signal line 206, which has received the voltage fluctuation of the FD 215, becomes statically settled, and the column circuit 203 takes in the statically settled voltage of the output signal line 206 as a signal voltage N, processes the signal, and stores it.

Thereafter, the TXA 213 is turned on/off, and the signal charge accumulated in the PDA 211 is transferred to the FD 215. The voltage of the FD 215 drops by an amount corresponding to the signal charge amount accumulated in the PDA 211. Thereafter, the system waits until the output signal line 206 which has been subjected to the voltage fluctuation of the FD 215 is stabilized, and the stabilized voltage of the output signal line 206 is taken in by the column circuit 203 as a signal voltage A, and is subjected to signal processing and saved.

Thereafter, the TXB 214 is turned on/off, and the signal charge accumulated in the PDB 212 is transferred to the FD 215. The voltage of the FD 215 drops by an amount corresponding to the signal charge amount accumulated in the PDB 212. Thereafter, the system waits until the output signal line 206 that has been subjected to the voltage fluctuation of the FD 215 is stabilized, and the stabilized voltage of the output signal line 206 is taken in by the column circuit 203 as a signal voltage (A+B), and is subjected to signal processing and saved.

From a difference between the signal voltage N and the signal voltage A thus taken in, an A-signal corresponding to the signal charge amount accumulated in the PDA 211 can be obtained. From a difference between the signal voltage A and the signal voltage (A+B), a B-signal according to the signal charge amount accumulated in the PDB 212 can be obtained. This difference calculation may be performed by the column circuit 203, or may be performed after output from the image sensor 122. A phase difference signal can be obtained by using the A-signal and the B-signal, respectively, and an image signal can be obtained by adding the A-signal and the B-signal together. Alternatively, when the difference calculation is performed after output from the image sensor 122, an image signal may be obtained by taking the difference between the signal voltage N and the signal voltage (A+B).

The signal voltage N, the signal voltage A, and the signal voltage B may be read out by performing drive similar to the drive for reading out the signal voltage N and the signal voltage A for the PDB 212 instead of the PDA 211. In that case, the A-signal and the B-signal obtained from the signal voltage A and the signal voltage B, respectively, can be used as they are as phase difference signals, and an image signal can be obtained by adding up the signal voltage A and the signal voltage B, or the A-signal and the B-signal. In this embodiment, the pixel from which the A-signal is obtained will be referred to as a first focus detecting pixel, and the pixel from which the B-signal is obtained will be referred to as a second focus detecting pixel.

FIG. 2C is an array diagram illustrating imaging pixels in an area of 4 columns by 4 rows. One pixel unit 200 including 2 columns×2 rows of imaging pixels includes a pixel 200R with a spectral sensitivity of R (red) located at the upper left corner, pixels 200Ga and 200Gb with a spectral sensitivity of G (green) located at the upper right and lower left corners, and a pixel 200B with a spectral sensitivity of B (blue) located at the lower right corner. Each imaging pixel includes a first focus detecting pixel 201 and a second focus detecting pixel 202.

In the pixels 200R, 200Ga, and 200B, the first focus detecting pixel 201 and the second focus detecting pixel 202 are arranged in the horizontal direction (first direction), and in the pixel 200Gb, the first focus detecting pixel 201 and the second focus detecting pixel 202 are arranged in the vertical direction (second direction). In this embodiment, the phase-difference AF unit 129 performs first focus detection based on a first signal obtained from a pair of pixels (pixels 200Ga) arranged in a first direction (horizontal direction) in the image sensor 122. The first focus detection is performed using a first focus detecting area group including a plurality of first focus detecting areas (focus detecting frames, focus detecting areas). The phase-difference AF unit 129 also performs second focus detection based on a second signal obtained from a pair of pixels (pixels 200Gb) arranged in a second direction (vertical direction) different from the first direction. The second focus detection is performed using a second focus detecting area group including a plurality of second focus detecting areas.

Figure 3A:
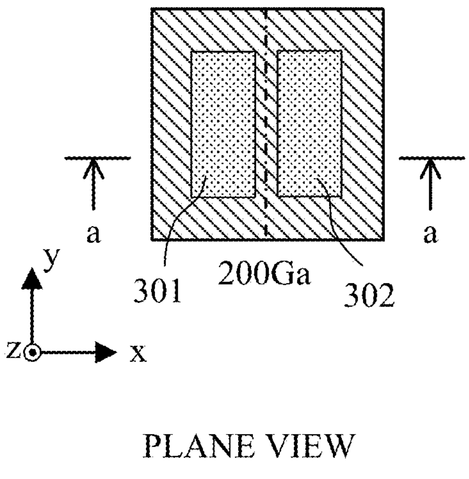
FIGS. 3A and 3B are a plan view and a sectional view of a pixel according to this embodiment.
Figure 3B:
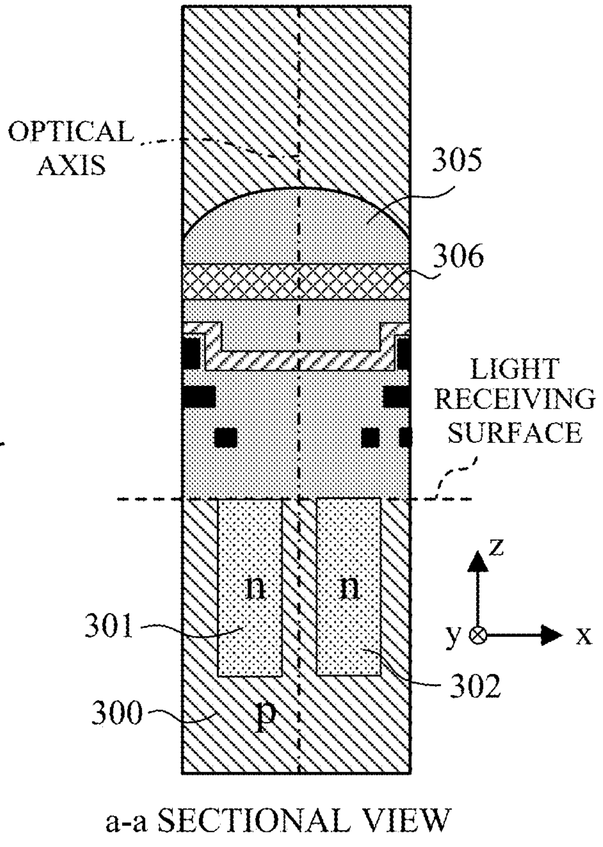

FIG. 3A is a plane view of the pixel 200Ga when viewed from the incident side (+z side) of the image sensor 122, and FIG. 3B is a plane view illustrating the pixel structure of the pixel 200Ga when "a-a" section of the pixel 200Ga in FIG. 3A is viewed from the −y side. In the pixel 200Ga, a microlens 305 for condensing incident light is formed on the incident side, and photoelectric converters 301 and 302 divided into two in the x direction are formed. The photoelectric converters 301 and 302 correspond to the first focus detecting pixel 201 and the second focus detecting pixel 202, respectively.

The photoelectric converters 301 and 302 may be pin structure photodiodes in which an intrinsic layer is sandwiched between a p-type layer and an n-type layer, or may be pn junction photodiodes in which the intrinsic layer is omitted. A color filter 306 is formed between the microlens 305 and the photoelectric converters 301 and 302. The spectral transmittance of the color filter may be changed for each focus detecting pixel, or the color filter may be omitted.

Two light beams incident on the pixel 200Ga from the pair of pupil regions are each condensed by the microlens 305 and separated by a color filter 306, and then received by photoelectric converters 301 and 302. In each photoelectric converter, electrons and holes are generated in pairs according to a received light amount, and after they are separated by a depletion layer, negatively charged electrons are accumulated in the n-type layer. On the other hand, holes are discharged to the outside of the image sensor 122 through the p-type layer connected to an unillustrated constant voltage source. Electrons accumulated in the n-type layer of each photoelectric converter are transferred to a capacitance unit (FD) via a transfer gate and converted into a voltage signal.

Figure 4:
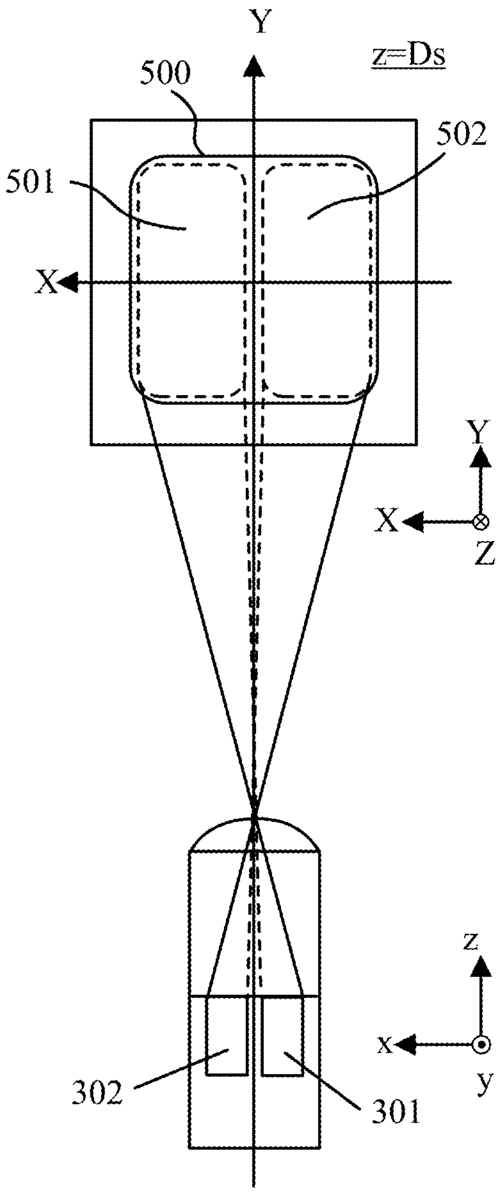
FIG. 4 explains pupil division according to this embodiment.

FIG. 4 illustrates a relationship between the pixel structure illustrated in FIGS. 3A and 3B and pupil division. The lower part of FIG. 4 illustrates the pixel structure when the "a-a" section in FIG. 3A is viewed from the +y side, and the upper part of FIG. 4 illustrates a pupil plane at pupil distance DS. In FIG. 4, the x-axis and y-axis of the pixel structure are inverted relative to FIG. 3B in order to correspond to the coordinate axes of the pupil plane. The pupil plane corresponds to the entrance pupil position of the image sensor 122. In this embodiment, by offsetting (shrinking) a microlens position in each pixel from the center of the image sensor 122, the entrance pupils in each pixel overlap each other to form a single entrance pupil for the image sensor 122. The pupil distance DS is a distance between the pupil plane and the imaging surface, and will be referred to as a sensor-pupil distance hereinafter.

As illustrated in FIG. 4, the first pupil region 501 of the first focus detecting pixel 201 has an approximately conjugate relationship with the light receiving surface of the photoelectric converter 301 whose center of gravity is decentered in the −x direction due to the microlens. The first pupil region 501 is a pupil region through which a light beam to be received by the first focus detecting pixel 201 passes. The center of gravity of the first pupil region 501 is eccentric to the +X side on the pupil plane. The second pupil region 502 of the second focus detecting pixel 202 has an approximately conjugate relationship with the light receiving surface of the photoelectric converter 302 whose center of gravity is decentered in the +x direction due to the microlens. The second pupil region 502 is a pupil region through which a light beam to be received by the second focus detecting pixel 202 passes. The center of gravity of the second pupil region 502 is eccentric to the −X side on the pupil plane. The pupil region 500 is a pupil region through which a light beam to be received by the entire pixel 200G including the photoelectric converters 301 and 302 (the first focus detecting pixel 201 and the second focus detecting pixel 202) passes.

Figure 5:
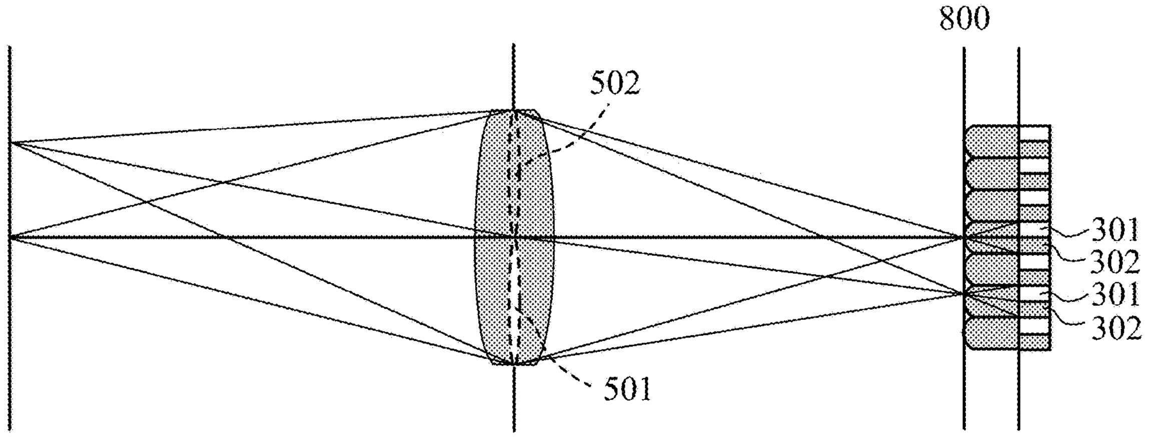
FIG. 5 explains another pupil division according to this embodiment.

FIG. 5 explains another pupil division. As illustrated in FIG. 5, light beams that enter the imaging optical system from the object (vertical line on the left in FIG. 5) and pass through the first pupil region 501 and the second pupil region 502 enter corresponding imaging pixels at different angles and are received by the photoelectric converters 301 and 302. The pixels 200R, 200Ga, and 200B perform pupil division in the horizontal direction (x-axis direction in FIG. 4), and the pixel 200Gb performs pupil division in the vertical direction (y-axis direction in FIG. 4). Imaging pixels each having a first focus detecting pixel and a second focus detecting pixel receive light beams passing through the first pupil region 501 and the second pupil region 502. A pair of focus detecting signals is generated by combining the respective output signals of the first focus detecting pixel 201 and the second focus detecting pixel 202 in the plurality of imaging pixels. Adding the output signals of the first focus detecting pixel 201 and the second focus detecting pixel 202 of the plurality of imaging pixels can generate an imaging signal with a resolution of the effective pixel number N(=m×n). The other focus detecting signal may be generated by subtracting one of the pair of focus detecting signals from the imaging signal.

This embodiment provides all the imaging pixels on the image sensor 122 with the first and second focus detecting pixels, but two imaging pixels may be used as the first and second focus detecting pixels, and part of the imaging pixels may be provided with the first and second focus detecting pixels.

Relationship Between Defocus Amount and Image Shift Amount

Figure 6:
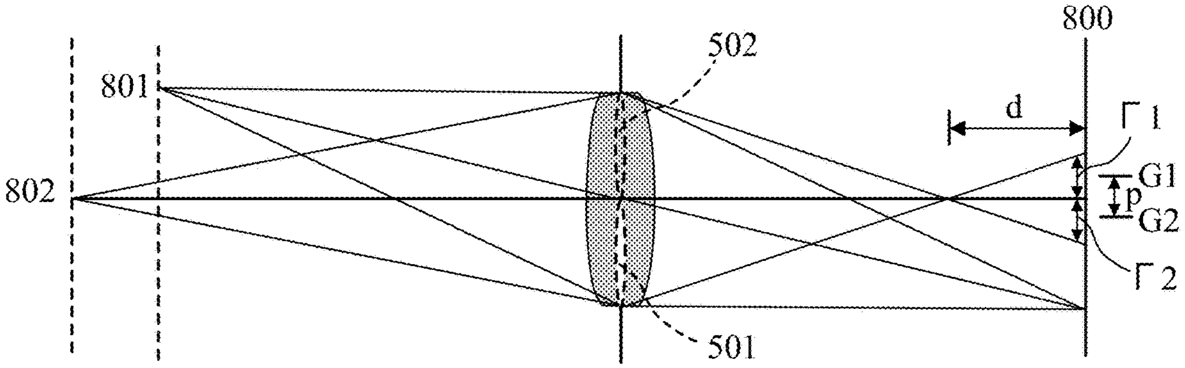
FIG. 6 illustrates a relationship between an image shift amount and a defocus amount according to this embodiment.

FIG. 6 illustrates a relationship between a defocus amount and an image shift amount of two-image data. Reference numeral 800 denotes an imaging surface of the image sensor 122, and the pupil surface of the image sensor 122 is divided into two, a first pupil region 501 and a second pupil region 502. A defocus amount d has a magnitude (absolute value) of |d|, which is a distance from an imaging position (image position) of an object image to the imaging surface 800. A front focus state where the image position is located on the object side of the imaging surface 800 has a negative sign (d<0), and a rear focus state where the image position is located on the opposite side to the object of the imaging surface 800 has a positive sign (d>0). An in-focus state in which the image position is located on the imaging surface 800 is expressed as d=0.

In FIG. 6, object 801 illustrates an in-focus state (d=0), and object 802 illustrates a front focus state (d<0). The front focus state (d<0) and the rear focus state (d>0) will be collectively referred to as a defocus state (|d|>0).

In the front focus state, among the light beams from the object 802, the light beams that have passed through each of the first pupil region 501 and the second pupil region 502 are once condensed, then spread with widths Γ1 and Γ2 at centers of the center of gravity positions G1 and G2 of the light beams, and form a blurred optical image on the imaging surface 800. These blurred images are received by the first focus detecting pixel 201 and the second focus detecting pixel 202 in each imaging pixel on the imaging surface 800, and thereby the first focus detecting signal and the second focus detecting pixel as a pair of focus detecting signals are generated. The first focus detecting signal and the second focus detecting signal are recorded as blurred images in which the object 802 is spread to blur widths Γ1 and Γ2 at the center of gravity positions G1 and G2 on the imaging surface 800, respectively. The blur widths Γ1 and Γ2 increase approximately in proportion to an increase in the magnitude |d| of the defocus amount d. Similarly, the magnitude |p| of an image shift amount p between the first focus detecting signal and the second focus detecting signal (=difference G1−G2 in the center of gravity position between the light beams) also increases approximately in proportion to the increase of the magnitude |d| of the defocus amount d. The rear focus state (d>0) is similar, although the image shift direction between the first focus detecting signal and the second focus detecting signal is opposite to that of the front focus state.

In this embodiment, a difference in the center of gravity of the incident angle distributions in the first pupil region

501 and the second pupil region 502 will be referred to as a base length. A relationship between the defocus amount d and the image shift amount p on the imaging surface 800 is approximately similar to a relationship between the base length and the sensor-pupil distance. Since the magnitude of the image shift amount between the first focus detecting signal and the second focus detecting signal increases as the defocus amount d increases, the phase-difference AF unit 129 converts the image shift amount into the defocus amount using the conversion coefficient calculated based on the base length and this relationship.

In the following description, calculating a defocus amount using a pair of focus detecting signals from focus detecting pixels that are divided in the horizontal direction (lateral direction) like the pixel 200Ga will be referred to as horizontal focus detection (first focus detection). Calculating a defocus amount using a pair of focus detecting signals from focus detecting pixels that are divided in the vertical direction (longitudinal direction) like the pixel 200Gb will be referred to as vertical focus detection (second focus detection).

Arrangement of Focus Detecting Areas

Figure 7:
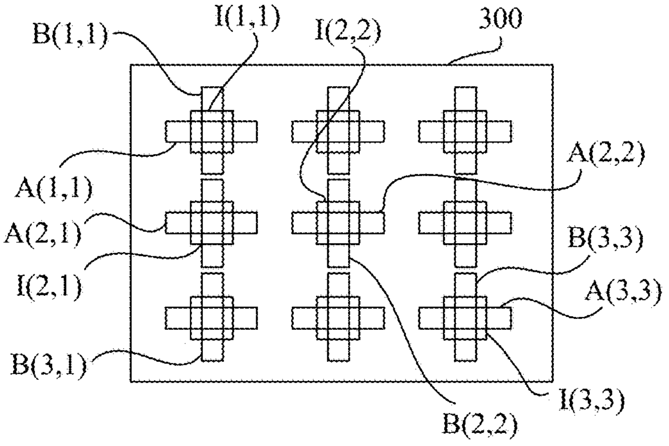
FIG. 7 illustrates a layout of focus detecting areas according to this embodiment.

Referring now to FIG. 7, a description will be given of focus detecting areas, which are areas of the image sensor 122 from which a pair of signal sequences for detecting a phase difference is acquired. In FIG. 7, A(n, m) and B(n, m) indicate the n-th focus detecting area in the x direction and the m-th focus detecting area in the y direction among a plurality of focus detecting areas (three in the x direction and three in the y direction, for a total of nine) which are set in an effective pixel area 300 of the image sensor 122. A signal sequence of a pixel pair which is pupil-divided in a horizontal direction is generated from a plurality of pixels included in the focus detecting area A(n, m). A signal sequence of a pixel pair which is pupil-divided in a vertical direction is generated from a plurality of pixels included in the focus detecting area B(n, m). I(n, m) indicates an index which displays a position of the focus detecting area A(n, m) or B(n, m) on the display unit 126. By arranging the focus detecting areas in this manner, the focus detection can be performed at the position of the index I(n, m) by using contrast information corresponding to both the horizontal and vertical directions of the object.

The nine focus detecting areas which are illustrated in FIG. 7 are merely an example, and the number, positions and sizes of the focus detecting areas are not limited. For example, one or more areas may be set as a focus detecting area within a predetermined range centered on a position specified by the user or the object position detected by the object detector 130. In acquiring a defocus map, which will be described later, this embodiment arranges focus detecting areas so as to obtain focus detection results with higher resolution. For example, a group of focus detection results obtained from totally 187 horizonal focus detecting areas (a first focus detecting area group which includes a plurality of first focus detecting areas) arranged on the image sensor 122, horizontal 17 divisions and vertical 11 divisions, is arranged as a horizonal defocus map. In addition, for example, a group of focus detection results obtained from vertical focus detecting areas (a second focus detecting area group which includes a plurality of second focus detecting areas) arranged on the image sensor 122 in a total of 35 points, divided into 7 horizontally and 5 vertically, is arranged as a vertical defocus map. The method of arranging the focus detecting areas for the horizonal focus detection and the focus detecting areas for the vertical focus detection for the object will be described in detail later.

Imaging Processing

Figure 8:
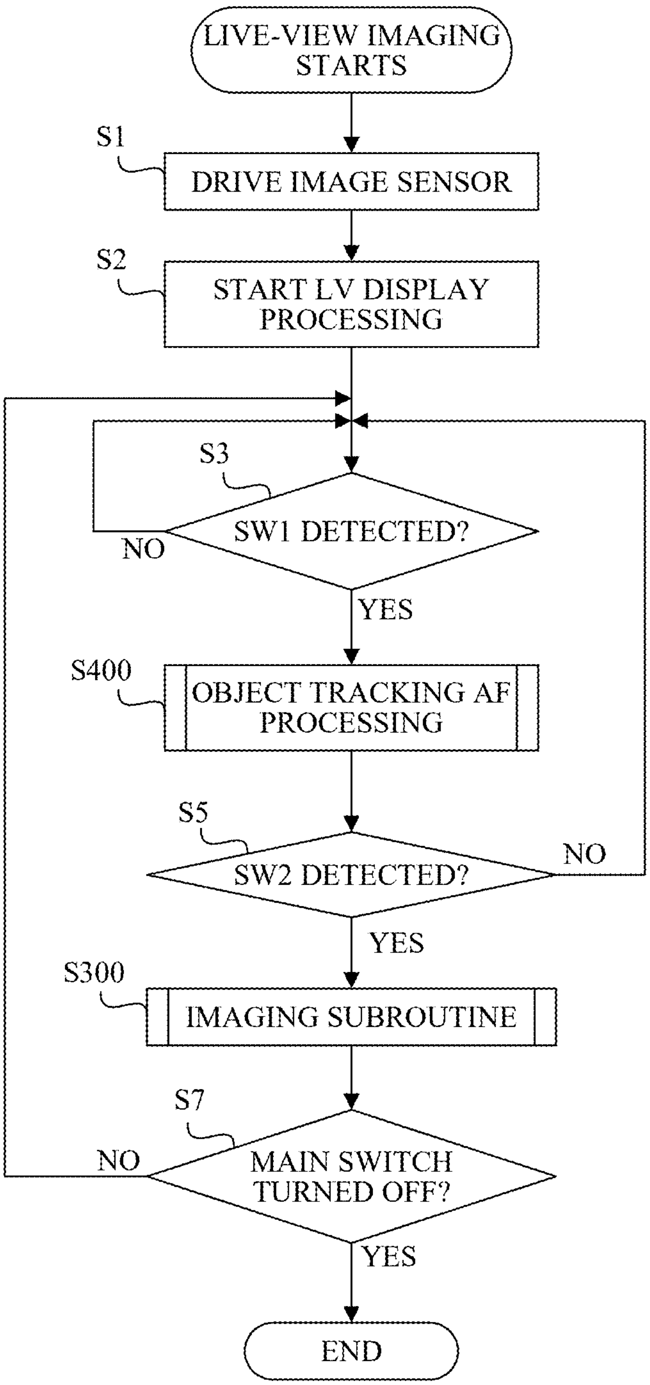
FIG. 8 is a flowchart of live-view imaging processing according to this embodiment.

FIG. 8 is a flowchart which illustrates an AF/imaging processing (image processing method) for causing the camera body (image pickup apparatus) 120 according to this embodiment to perform an AF operation and an imaging operation. More specifically, FIG. 8 illustrates the processing (live-view imaging processing) that causes the camera body 120 to perform a pre-imaging operation that displays a live-view image on the display unit 126 to an operation that captures a still image. The camera MPU 125, which is a computer, executes this processing according to a computer program.

First, in step S1, the camera MPU 125 causes the image sensor drive circuit 123 to drive the image sensor 122 and acquires imaging data from the image sensor 122. Thereafter, the camera MPU 125 acquires first and second focus detecting signals from the plurality of first and second focus detecting pixels included in each of the focus detecting areas illustrated in FIG. 7 from the acquired imaging data. The camera MPU 125 also adds the first and second focus detecting signals of all effective pixels of the image sensor 122 to generate an imaging signal, and has the image processing circuit 124 perform the image processing for the imaging signal (imaging data) to acquire image data. In a case where the imaging pixels and the first and second focus detecting pixels are provided separately, the camera MPU 125 acquires the image data by performing interpolation processing for the focus detecting pixels.

Next, in step S2, the camera MPU 125 causes the image processing circuit 124 to generate a live-view image from the image data acquired in step S2, and causes the display unit 126 to display this image. The live-view image is a reduced image which matches a resolution of the display unit 126, and the user can adjust an imaging composition, an exposure condition, and the like while viewing this image. Therefore, the AE unit 131 and the camera MPU 125 perform an exposure adjustment based on a photometric value obtained from the image data, and display the image on the display unit 126. The exposure adjustment is achieved by properly adjusting an exposure time, opening and closing an aperture of an imaging lens, and controlling a gain of an output of the image sensor 122.

Next, in step S3, the camera MPU 125 determines whether or not a switch Sw1, which instructs a start of an imaging preparation operation, has been turned on by half-pressing a release switch included in the operation switch 127. In a case where the switch Sw1 is not turned on, the camera MPU 125 repeats the determination in step S3 in order to monitor a timing at which the switch Sw1 is turned on. On the other hand, in a case where the switch Sw1 is turned on, the camera MPU 125 proceeds to step S400 and performs object tracking AF processing. Here, the camera MPU 125 performs processing such as detecting the object area from the acquired imaging signal and focus detecting signal, setting the focus detecting area, and predictive AF processing to suppress influence of a time lag between the focus detection processing and the imaging processing for a recorded image. Details will be given later.

The camera MPU 125 then proceeds to step S5, and determines whether or not a switch Sw2, which instructs a start of an imaging operation, has been turned on by fully pressing the release switch. In a case where the switch Sw2 is not turned on, the camera MPU 125 returns to step S3. On the other hand, in a case where the switch Sw2 is turned on, the flow proceeds to step S300, where an imaging subroutine is executed. The imaging subroutine will be described in detail later. When the imaging subroutine ends, the flow proceeds to step S7.

In step S7, the camera MPU 125 determines whether or not a main switch included in the operation switch 127 has been turned off. In a case where the main switch is turned off, the camera MPU 125 ends this processing, and in a case where the main switch is not turned off, the flow returns to step S3.

In this embodiment, after it is detected in step S3 that the switch Sw1 is turned on, the object detection processing and AF processing are performed, but the timing for performing these processes is not limited to this example. The object tracking AF processing performed in step S400 before the switch Sw1 is turned on can eliminate the need for a preparatory operation by the user before imaging.

Imaging Subroutine

Figure 9:
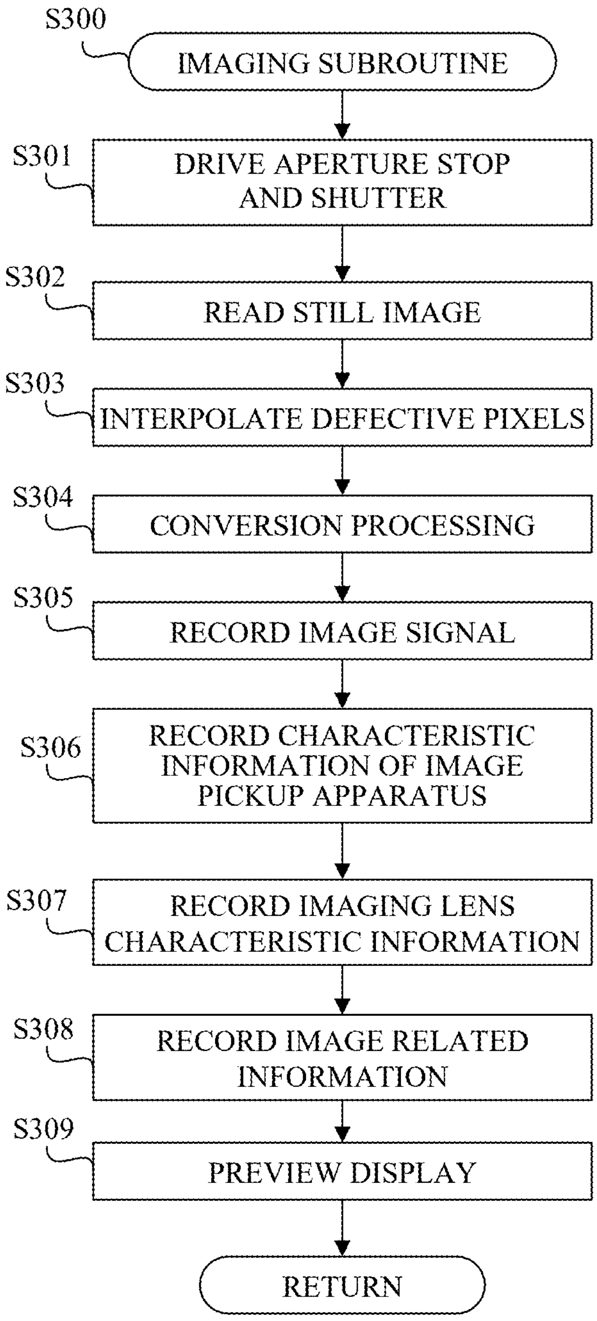
FIG. 9 is a flowchart of an imaging subroutine according to this embodiment.

Next, the imaging subroutine executed by the camera MPU 125 in step S300 of FIG. 8 will be described with reference to the flowchart illustrated in FIG. 9.

First, in step S301, the AE unit 131 performs exposure control processing and determines imaging conditions (a shutter speed, an aperture value (F-number), an imaging sensitivity, etc.). This exposure control processing can be performed using luminance information acquired from the image data of the live-view image. The camera MPU 125 then transmits the determined aperture value to the aperture drive circuit 115 to drive the aperture stop 102. The camera MPU 125 transmits the determined shutter speed to the shutter 133 to open the focal plane shutter. The camera MPU 125 causes the image sensor 122 to accumulate electric charges during the exposure period through the image sensor drive circuit 123.

After the exposure control processing is performed, in step S302, the camera MPU 125 causes the image sensor drive circuit 123 to read out all pixels on the image sensor 122 for imaging signals of still image capturing. The camera MPU 125 causes the image sensor drive circuit 123 to read out one of the first and second focus detecting signals from the focus detecting area (in-focus target area) on the image sensor 122. By subtracting one of the first and second focus detecting signals from the imaging signal, the other focus detecting signal can be acquired.

Next, in step S303, the camera MPU 125 causes the image processing circuit 124 to perform defective pixel correction processing for the imaging data which was read out in step S302 and A/D converted. Next, in step S304, the camera MPU 125 causes the image processing circuit 124 to perform image processing and encoding processing for the imaging data that has received the defective pixel correction processing. The image processing includes, for example, demosaic (color interpolation) processing, white balance processing, gamma correction (tone correction) processing, color conversion processing, and edge enhancement processing, but is not limited to them. Next, in step S305, the camera MPU 125 records, as an image data file, in the memory 128, still image data as image data acquired by performing each processing in step S304, and one of the focus detecting signals read out in step S302.

Next, in step S306, the camera MPU 125 records camera characteristic information as characteristic information on the camera body 120 in the memory 128 and in a memory within the camera MPU 125, in association with the still image data recorded in step S305. The camera characteristic information includes, for example, the following information:

imaging condition (an aperture value, a shutter speed, an imaging sensitivity, etc.), information on the image processing performed by the image processing circuit 124, information on a light receiving sensitivity distribution of the imaging pixels and focus detecting pixels on the image sensor 122, information on vignetting of an imaging light beam in the camera body 120, information on a distance from an attachment surface of the imaging optical system in the camera body 120 to the image sensor 122, and information on manufacturing errors of the camera body 120.

Information on the light receiving sensitivity distribution of the imaging pixels and focus detecting pixels (simply referred to as light receiving sensitivity distribution information hereinafter) is information on the sensitivity of the image sensor 122 depending on a distance (position) on the optical axis from the image sensor 122. The light receiving sensitivity distribution information depends on the microlens 305 and the photoelectric converters 301 and 302, and therefore may be information relating to these. The light receiving sensitivity distribution information may be information on a change in sensitivity with respect to an incident angle of light.

Next, in step S307, the camera MPU 125 records lens characteristic information as characteristic information on the imaging optical system in the memory 128 and in the memory within the camera MPU 125, in association with the still image data recorded in step S305. The lens characteristic information includes, for example, information on an exit pupil, a frame such as a lens barrel which blocks a light beam, a focal length and an F-number during imaging, an aberration of the imaging optical system, a manufacturing error of the imaging optical system, or a position of the focus lens 104 during imaging (object distance).

Next, in step S308, the camera MPU 125 records image related information, which is information on the still image data, in the memory 128 and in the memory within the camera MPU 125. The image related information includes, for example, information on a focus detection operation before image capturing, information on a movement of the object, and information on a focus detection accuracy. Next, in step S309, the camera MPU 125 performs a preview display of the captured image on the display unit 126. This allows the user to easily check the captured image. When the processing of step S309 ends, the camera MPU 125 ends this imaging subroutine and proceeds to step S7 of FIG. 8.

Subroutine of Object Tracking AF Processing

Next, a subroutine of the object tracking AF processing executed by the camera MPU 125 in step S400 of FIG. 8 will be described with reference to FIG. 10. The chronological order in which steps S401 to S406 in this embodiment are executed will be described later with reference to FIG. 23.

First, in step S401, the camera MPU 125 and the phase-difference AF unit 129 perform focus detection processing by using the first and second focus detecting signals acquired in each of the plurality of focus detecting areas acquired in step S2. Details of this will be described later.

Next, in step S402, the camera MPU 125 performs object detection processing and tracking processing. The object detection processing is executed by the object detector 130. Depending on a state of the obtained image, an object may not be detectable. In this case, the tracking processing using other means such as template matching is performed to estimate a position of the object. Details of this will be described later.

Next, in step S403, the camera MPU 125 performs main object determination processing. The method for determining a main object is determined according to a priority order based on a predetermined criterion. For example, the closer a position of an object detecting area is to a central image height, the higher the priority is set, and in a case where the positions are the same (the distances from the central image height are the same), the larger the size is, the higher the priority is set. Also, a configuration may be adopted in which a defocus map is used to select a portion of a particular type of object (person) that the user often wishes to focus on.

Next, in step S404, the camera MPU 125 and the phase-difference AF unit 129 determine whether or not flicker occurs in each focus detecting area (flicker determination). In the vertical focus detection, the focus detection accuracy may decrease due to the influence of flicker, so in a case where the influence of flicker is expected to be large, a result of the vertical focus detection is not used. The method of detecting flicker and the determination of whether or not the vertical focus detection can be used will be described in detail later.

Next, in step S405, the camera MPU 125 and the phase-difference AF unit 129 perform defocus amount selection processing. Based on the object information obtained in step S402 and the flicker determination result obtained in step S404, a defocus amount, which is the focus detection result, is selected using the focus detection results obtained from the arranged horizonal defocus map and vertical defocus map. Details of this will be described later.

Next, in step S406, the camera MPU 125 performs the predictive AF processing using the defocus amount obtained in step S405 and a plurality of defocus amounts which are time-series data on the timings at which past focus detections were performed. This is necessary processing when there is a time lag between the timing of focus detection and the timing of exposure for the captured image. That is, this is processing for performing AF control by predicting a position of the object in the optical axis direction at the timing of exposure for the captured image, which is a predetermined time after the timing of focus detection.

An image plane position of an object is predicted by performing multivariate analysis (for example, the least squares method) using historical data of the image plane positions of the object in the past and time, to obtain an equation for a prediction curve. By substituting the time of exposure for the captured image into the equation for the obtained prediction curve, the predicted image plane position of the object can be calculated. Not only the optical axis direction but also three-dimensional positions may be predicted. Assume that the screen is represented as XY and the optical axis direction is represented as the Z direction, forming vectors in the XYZ directions. Then, an object position at an exposure timing for a captured image may be predicted from the XY position of the object obtained by the object detection and tracking processing in step S402 and the time-series data of the Z direction position from the defocus amount obtained in step S405.

The prediction may be performed from time-series data on joint positions of a human object. The above prediction enables each position to be estimated even if a ball or person is hidden during imaging, or even if some of the person's joint positions become invisible. The object to be predicted is not only the main object, but also a plurality of detected objects. By performing the predictive AF processing for a plurality of objects, when the main object is switched, it is not necessary to re-accumulate the history of a defocus amount of a new main object, and the predictive AF can be continued without time loss.

In step S406, the camera MPU 125 calculates a drive amount of the focus lens 104 using the predictive AF processing result. According to a focus drive command from the camera MPU 125, the lens MPU 117 drives the focus actuator 113 using the focus drive circuit 116 to move the focus lens 104 in the optical axis direction, thereby performing focusing processing. When the processing of step S406 ends, the camera MPU 125 ends the subroutine of this object tracking AF processing, and proceeds to step S5 in FIG. 8.

Figure 22:
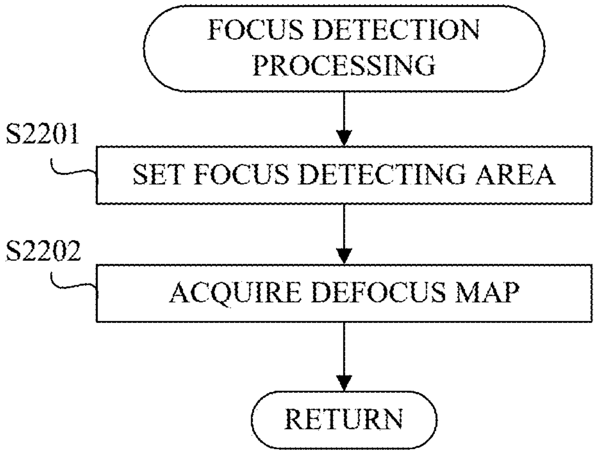
FIG. 22 is a flowchart of focus detection processing according to this embodiment.
Figure 23:
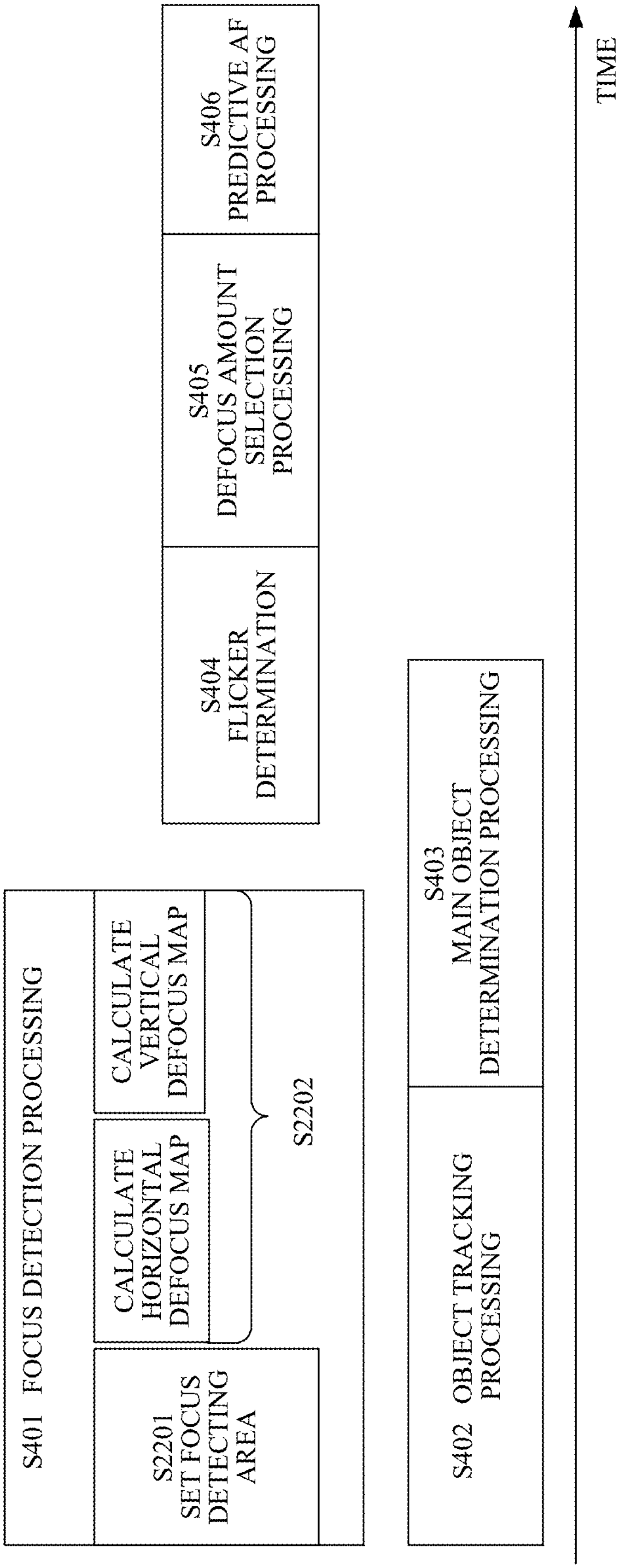
FIG. 23 illustrates an execution sequence of object tracking AF processing according to this embodiment.

Referring now to FIG. 23, a description will be given of the chronological execution order of steps S401 to S406 in FIG. 10. This embodiment simultaneously executes the focus detection processing in step S401 and the object tracking processing in step S402. Step S401 is executed by the camera MPU 125 and the phase-difference AF unit 129, and step S402 is executed by the object detector 130. Step S402 may be executed after step S401 is completed. In the focus detection processing in step S401, step S2202 in FIG. 22 is performed after step S2201 in FIG. 22 is completed. This embodiment calculates the vertical defocus map after the horizonal defocus map is calculated. The reason is that in a case where the image sensor 122 reads out images using the slit rolling method, the signals in the horizonal direction are read out first and can be calculated first. However, this embodiment is not limited to this example, and the vertical defocus map may be calculated first, and then the horizonal defocus map may be calculated.

The main object determination processing in step S403 is executed after the completion of step S402. In step S403, the defocus map is used, but in this embodiment, since calculation of the vertical defocus map has not been completed, the horizonal defocus map is used. Step S403 may be executed after step S401 is completed.

In this embodiment, step S404 is executed after steps S401 and S403 are completed. In this embodiment, step S405 is executed after steps S403 and S404 are completed. In this embodiment, step S406 is executed after the completion of step S405.

Subroutine of Focus Detection Processing

Next, a subroutine of the focus detection processing executed by the camera MPU 125 in step S401 of FIG. 10 will be described with reference to FIG. 22.

First, in step S2201, the camera MPU 125 sets a focus detecting area. This embodiment sets totally 187 horizonal focus detecting areas on the image sensor 122, horizontal 17 divisions and vertical 11 divisions. The camera MPU 125 sets totally 35 vertical focus detecting areas on the image sensor 122, horizontal 7 divisions and vertical 5 divisions. The center of the focus detecting area is set based on either the AF area set via the operation switch 127, the position of the object detected and tracked in step S402, or the position of the main object determined in step S403. In this embodiment, a group of focus detection results obtained from the horizonal focus detecting areas will be referred to as a horizonal defocus map, and a group of focus detection results obtained from the vertical focus detecting area will be referred to as a vertical defocus map.

Figure 18A:
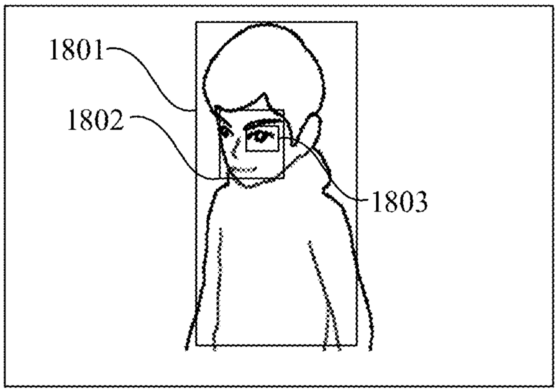
FIGS. 18A, 18B, 18C, 18D, 18E, 18F, 18G, and 18H illustrate a method of setting a defocus map according to this embodiment.

A method for setting a defocus map, which is a group of horizonal and vertical focus detecting areas, will be described with reference to FIGS. 18A, 18B, 18C, 18D, 18E, 18F, 18G, and 18H. FIG. 18A illustrates an object area detected by the object detection processing in a case where the object is a person. Reference numeral 1801 denotes an upper body detecting area (entire detecting area, first detecting area), reference numeral 1802 denotes a face detecting area (first detecting area or second detecting area), and reference numeral 1803 denotes an eye detecting area (local detecting area, second detecting area).

Figure 18B:
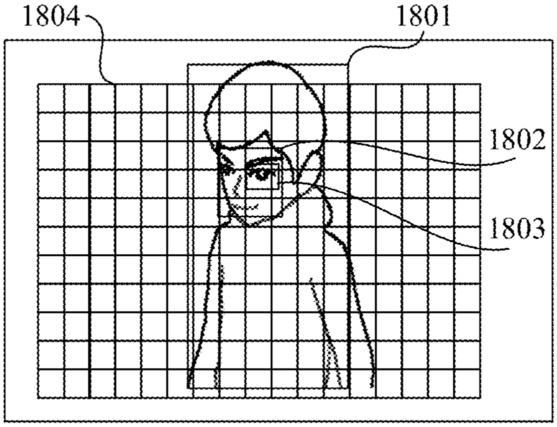

The arrangement of the horizonal defocus map, which is a horizonal focus detecting area group, will be described. FIG. 18B illustrates the horizonal defocus map during pupil detection, and reference numeral 1804 denotes the horizonal defocus map. The horizonal defocus map is arranged relative to the center of the upper body detecting area so as to encompass the object. Thereby, the object can fall within the defocus map even when the object as a person is moving or during framing with the camera.

Figure 18C:
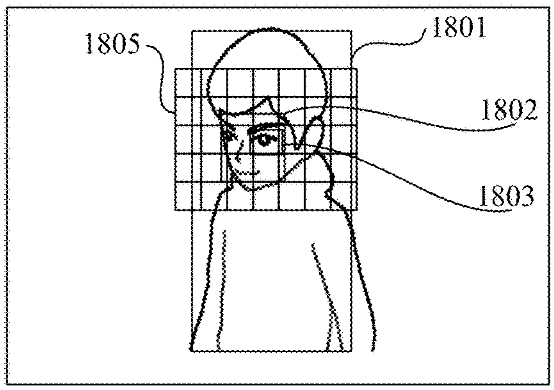

Next, the arrangement of the vertical defocus map, which is a vertical focus detecting area group, will be described. FIG. 18C illustrates the vertical defocus map when a face is detected, and reference numeral 1805 denotes the vertical defocus map. This embodiment assumes that the vertical defocus map has a smaller area than that of the horizonal defocus map due to the constraints of calculation time. In other words, the number of first focus detecting areas included in the first focus detecting area group (horizonal defocus map 1804) is larger than the number of second focus detecting areas included in the second focus detecting area group (vertical defocus map 1805).

Since the horizonal defocus map can encompass the object, the vertical defocus map is set based on the area on which the user wishes to focus on. In a case of a person, the area on which the user wishes to focus on is often the pupil, so in FIG. 18C, the vertical defocus map is set with the pupil detecting area 1803 at the center. Thereby, in a defocus amount selection processing described later, the user can select the defocus amount by using both the horizonal defocus map and the vertical defocus map in the area where the user wishes to focus on.

Figure 18D:
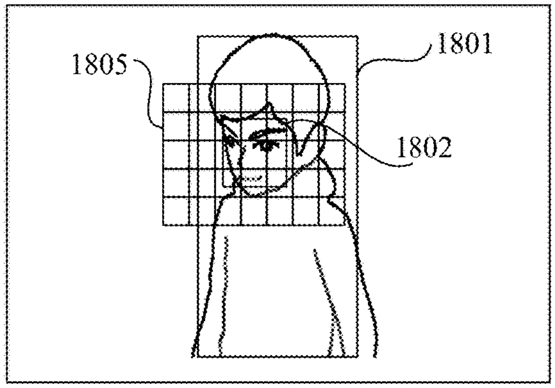
Figure 18E:
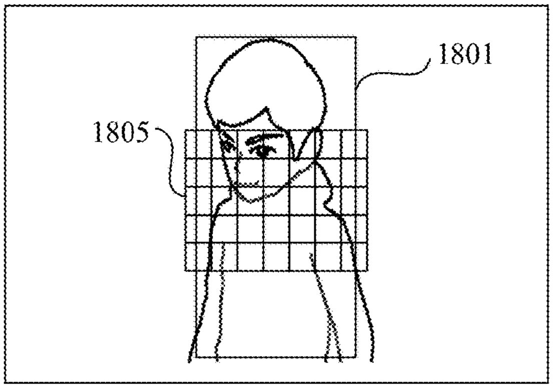

In a case where the pupil has not been detected, the vertical defocus map is set with the face detecting area 1802 at the center, as illustrated in FIG. 18D. In a case where the face has not been detected, the vertical defocus map is set with the upper body detecting area 1801 at the center, as illustrated in FIG. 18E.

The horizonal defocus map and the vertical defocus map may be set so that the center position and area of each focus detecting area are similar. Thereby, the focus detection can be performed using signals from the same focus detecting area, and thus in the defocus amount selection processing described below, the horizontal defocus amount and the vertical defocus amount can be used together without distinction.

Figure 18F:
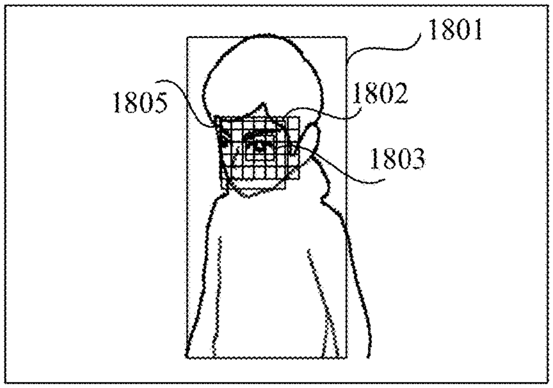

FIG. 18F illustrates a case where the area of the vertical defocus map is made smaller and each focus detecting area is made smaller. That is, the density of the second focus detecting areas included in the second focus detecting area group is higher than the density of the first focus detecting areas included in the first focus detecting area group. Densely arranging the vertical defocus map in the face detecting area can achieve defocus amount selection processing described later using a greater number of defocus amounts.

Figure 18G:
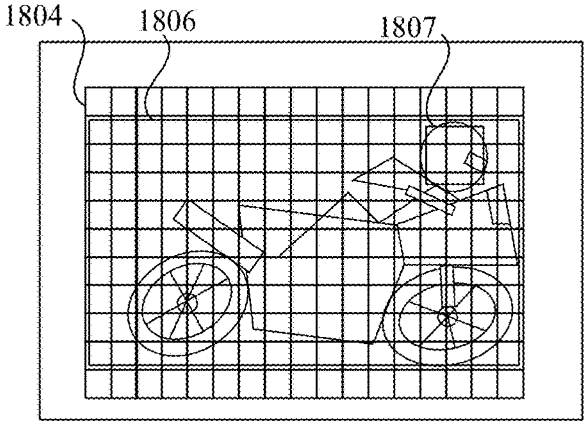

FIG. 18G illustrates an example in which the object is a motorcycle. Reference numeral 1806 denotes the entire detecting area of the motorcycle, and reference numeral 1807 denotes a local detecting area which is the area of a helmet of the motorcycle. Similarly to the case of the person, the horizonal defocus map may be placed to encompass the entire detecting area.

Figure 18H:
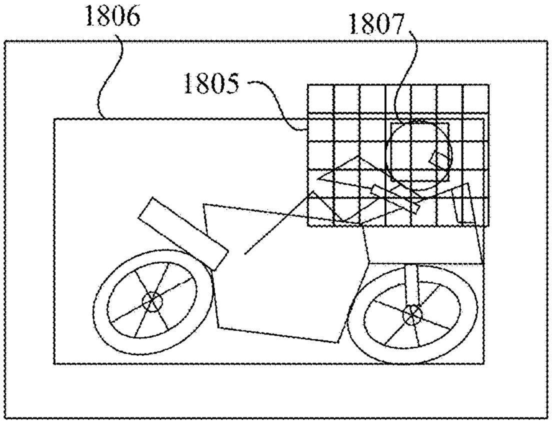

FIG. 18H illustrates the setting of the vertical defocus map when the motorcycle is locally detected. The vertical defocus map is not placed at the center of the local detecting area 1807, but is placed in an area in which the position and size of the horizonal defocus map and each focus detecting area can be aligned and which encompasses the local detecting area. Thereby, as described above, the defocus amount is the result of horizonal focus detection and vertical focus detection using signals from the same focus detecting area. Therefore, in the defocus amount selection processing described later, the horizonal defocus amount and the vertical defocus amount can be used together without distinction.

Next, in step S2202 in FIG. 22, the camera MPU 125 acquires a defocus map. For the focus detecting area set in step S2201, the phase-difference AF unit 129 calculates an image shift amount between the first and second focus detecting signals obtained in each of the plurality of focus detecting areas acquired in step S2. The phase-difference AF unit 129 then calculates the defocus amount and reliability for each focus detecting area from the image shift amount.

Subroutine of Object Detection and Tracking Processing

Next, a subroutine of the object detection and tracking processing executed by the camera MPU 125 in step S402 of FIG. 10 will be described with reference to FIG. 11.

First, in step S421, the camera MPU 125 sets dictionary data according to the type of an object to be detected from the image data acquired in step S1. Based on the object priority and the settings of the image pickup apparatus which have been previously set, dictionary data to be used in this processing is selected from a plurality of dictionary data stored in the dictionary data memory. For example, the plurality of dictionary data are stored by classifying objects into categories such as "person," "vehicle," and "animal." In this embodiment, the dictionary data to be selected may be one or more. In the case of single dictionary data, it becomes possible to repeatedly detect an object that can be detected by the single dictionary data, at a high frequency. On the other hand, in a case where the plurality of dictionary data are selected, the dictionary data can be set sequentially according to the priority of the detected object, thereby making it possible to detect the objects one by one.

Next, in step S422, the object detector 130 performs the object detection using the image data read out in step S1 as an input image and the dictionary data set in step S421. At this time, the object detector 130 outputs information such as the position, size, and reliability of the detected object. At this time, the camera MPU 125 may cause the display unit 126 to display the above information output by the object detector 130. In step S422, a plurality of areas of the object are detected hierarchically from the image data. For example, in a case where "person" or "animal" is set as dictionary data, a plurality of organs such as the "whole body" area, the "face" area, and the "eye" area are detected. While local areas such as a person's eye and face are areas as an object to be focused on and exposed, they may not be detectable due to surrounding obstacles or a direction of the face. Even in such a case, the object can be robustly detected continuously by detecting the whole body, and therefore the object is detected hierarchically. Similarly, in a case where a "vehicle" such as a motorcycle is set as dictionary data, the driver, the whole vehicle including the vehicle body, and the helmet (head) as a local area are detected hierarchically.

Next, in step S423, the camera MPU 125 performs known template matching processing using the object detecting area obtained in step S422 as a template. Using the plurality of images obtained in step S1, a similar area is searched for in the image obtained immediately before, using the object detecting area obtained in the previous image as a template. As is well known, any information may be used for template matching, such as luminance information, color histogram information, or feature point information such as corners and edges. There are various possible matching methods and template updating methods, and any of them may be used. The tracking processing performed in step S423 is performed in order to achieve stable object detection and tracking processing by detecting an area similar to the past object detection data from the image data obtained immediately before in a case where an object is not detected in step S422.

Next, in step S424, the object detector 130 performs an area division on a specific area for the detected object area into specific areas. The specific area refers to a part or the whole of the detected object area. For example, in a case where a person or an animal is detected, it is the area of the person's head, and in a case where a vehicle is detected, it is the area of the helmet. Unlike object detection, in which the size and position of an object are obtained using the size and coordinates of a rectangular area, the area division allows the detection result to be obtained as a high-resolution distribution of the specific area. As a method for the area division, any method (for example, the method disclosed in Japanese Patent Application Laid-Open No. 2011-237215) can be applied.

The object detector 130 uses a deep-trained CNN to infer the likelihood (probability) of each pixel area being the specific area. However, the object detector 130 may infer the likelihood of the specific area using a trained model that has been machine-learned using an arbitrary machine learning algorithm, or may determine the likelihood of the specific area based on a rule base. In a case where a CNN is used to infer the likelihood of the specific area, the CNN performs deep learning using the specific area as a positive example and areas other than the specific area as negative examples. As a result, the CNN outputs the likelihood of the specific area in each pixel area as an inference result.

Calculation Method of Specific Area

Figure 12A:
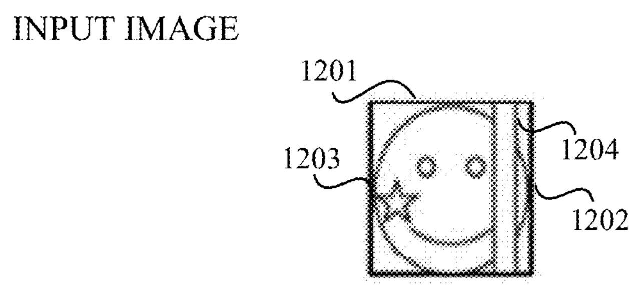
FIGS. 12A, 12B, and 12C illustrate an example of a CNN which infers a likelihood of a specific area according to this embodiment.
Figure 12B:
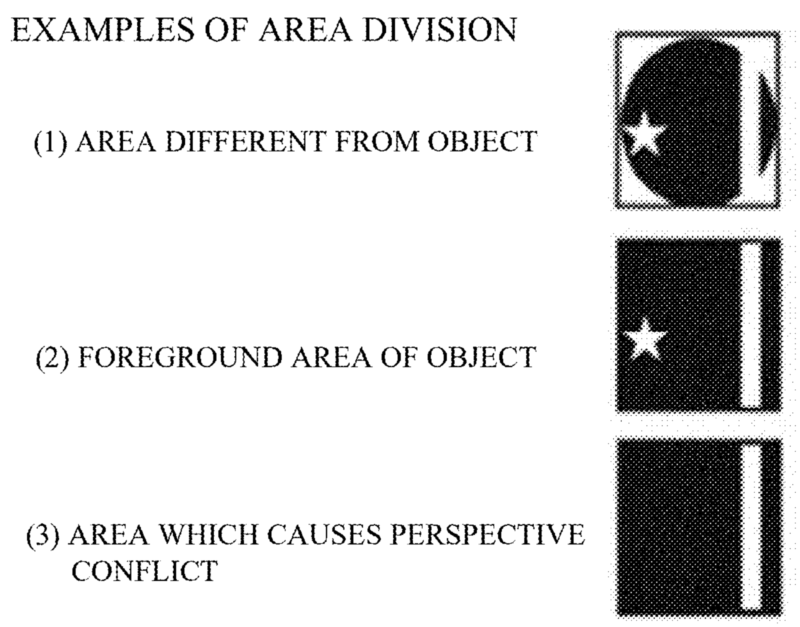
Figure 12C:
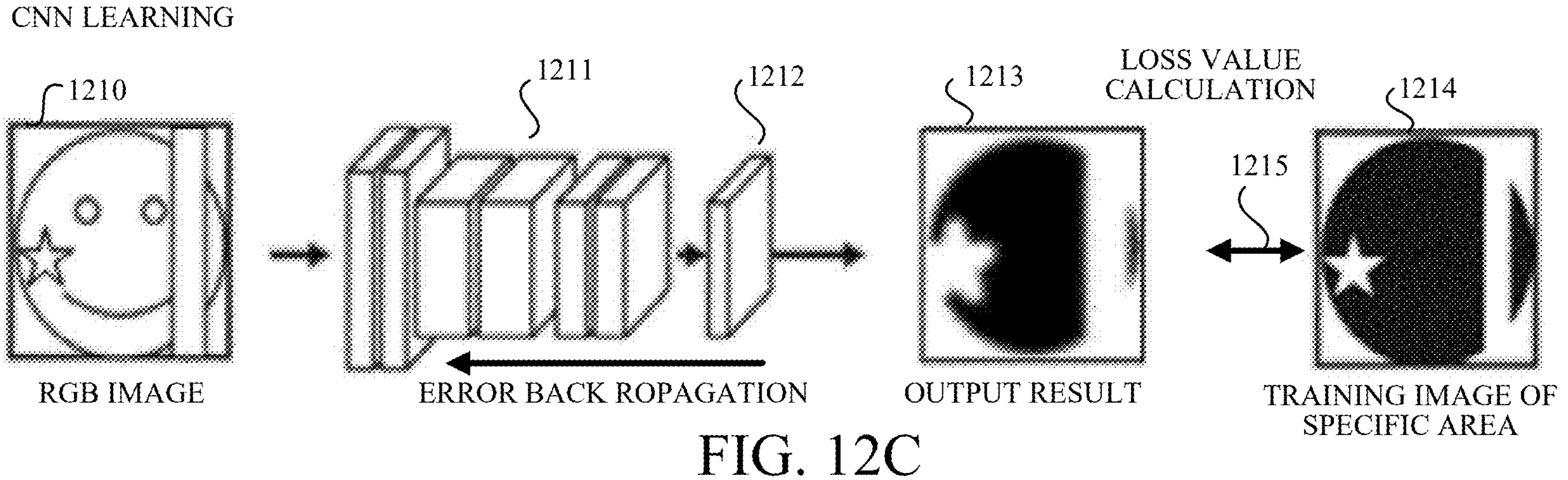

FIGS. 12A, 12B, and 12C illustrate an example of a convolutional neural network (CNN) which infers the likelihood of the specific area. FIG. 12A illustrates an example of an object area of an input image to be input to the CNN. The object area 1201 is detected from an image by the object detection described above. The object area 1201 includes a face area 1202 which is a target of the object detection. The face area 1202 in FIG. 12A includes two occluded areas (occluded areas 1203 and 1204). The occluded area 1203 is an area with no depth difference from the face area, and the occluded area 1204 is an area with a depth difference. The occluded area is also called an occlusion. In this embodiment, the face area 1202 excluding the occluded areas 1203 and 1204 is detected as the specific area.

FIG. 12B illustrates an example definition of specific area information. Each of images (1) to (3) in FIG. 12B is divided into black and white areas, where the black area indicates a positive example and the white area indicates a negative example. In FIG. 12B, the specific area information obtained by image division of the object area is an image that is assumed to be a candidate for training data that is used for deep learning of the CNN. Hereinafter, which of the specific area information in FIG. 12B is used as the training data in this embodiment will be described.

Image (1) in FIG. 12B illustrates an example of occlusion information in a case where the area is divided into an object area (face area) and a non-object area, the object area is treated as a positive example, and the areas other than the object area, such as the background and occluded areas, are treated as negative examples. Image (2) in FIG. 12B illustrates an example of occlusion information in a case where the area is divided into a foreground occluded area for the object and other areas, the foreground occluded area is treated as a negative example, and the areas other than the foreground occluded area relative to the object is treated as positive examples. Image (3) in FIG. 12B illustrates an example of occlusion information in a case where the area is divided into an occluded area which causes perspective conflict and other areas, and the occluded area which causes perspective conflict is treated as a negative example and the areas other than the occluded area which causes perspective conflict are treated as positive examples.

As illustrated in image (1) in FIG. 12B, a person's face in the image has a characteristic visibility pattern and a small pattern variance, so the area can be divided with high accuracy. For example, the occlusion information of image (1) in FIG. 12B is suitable as training data in the learning processing for generating the CNN that detects a person as an object. From the viewpoint of detection accuracy, the occlusion information of image (1) in FIG. 12B is more suitable than the occlusion information of image (3) in FIG. 12B. However, an image like image (3) in FIG. 12B is suitable as training data for the learning processing for generating the CNN that detects an occluded area, which causes perspective conflict. A pair of parallax images for the focus detection may be used as training data in the learning processing for generating the CNN that detects an occluded area which causes perspective conflict. The occlusion information is not limited to the above example, and may be generated based on an arbitrary method for dividing an area into an occluded area and areas other than the occluded area. This embodiment emphasizes the accuracy of the detecting area, and performs the learning processing using the information of image (1) in FIG. 12B, but may perform learning using other information.

FIG. 12C illustrates a flow of deep learning of the CNN. In this embodiment, an RGB image is used as the input image 1210 for learning. As a training image (teacher image), a training image 1214 (training image of specific area information) as illustrated in FIG. 12C is used. The training image 1214 is an image of face area information excluding the occlusion information and background information in FIG. 12B.

The input image 1210 for training is input to a neural network system 1211 (CNN). The neural network system 1211 can employ, for example, a layered structure in which convolutional layers and pooling layers are alternately stacked between an input layer and an output layer, and a multilayer structure in which a fully-connected layer is connected downstream of the layered structure. A score map that indicates the likelihood of a specific area in the input image is output from an output layer 1212 in FIG. 12C. The score map is output in the form of an output result 1213.

In deep learning of the CNN, an error between the output result 1213 and the training image 1214 is calculated as a loss value 1215. The loss value 1215 is calculated using a method such as cross entropy or squared error. Then, coefficient parameters such as the weights and biases of each node of the neural network system 1211 are adjusted so that the loss value 1215 gradually decreases. By performing sufficient deep learning of the CNN using many learning input images 1210, the neural network system 1211 will be able to output a more accurate output result 1213 when an unknown input image is input. In other words, when an unknown input image is input, the neural network system 1211 (CNN) outputs specific area information obtained through the area division of an occluded area and areas other than the occluded area with high accuracy as the output result 1213. Creating training data which identifies an occluded area (overlapping object area) requires a lot of work. Thus, it is conceivable to create training data using CG or using image combination in which an object image is cut out and superimposed.

As described above, this example has been described in which the image (1) in FIG. 12B is applied as the training image 1214, in which the face area, excluding the occluded area and background area, is the specific area. Here, as the training image 1214, an image like image (2) in FIG. 12B may be applied, in which an area with no depth difference (an area in the foreground of the object where the depth difference is less than a predetermined value) is treated as an occluded area. Alternatively, an image like image (3) in FIG. 12B may be applied, in which an area with a depth difference (an area in the foreground of the object where the depth difference is equal to or greater than a predetermined value) is treated as an occluded area. Even if an image such as image (2) or (3) in FIG. 12B is used as the training image 1214, when an unknown input image is input to the CNN, the CNN can infer an area which causes perspective conflict.

An arbitrary method other than the CNN can be applied to detect a specific area. For example, the detection of the specific area may be achieved by a rule-based approach. A trained model which has been machine-learned by an arbitrary method other than a deep-learned CNN may be used to detect the specific area. For example, occluded areas may be detected using a trained model which has been machine-learned by using any machine learning algorithm, such as a support vector machine or logistic regression. This is similar to object detection.

This embodiment detects the specific area for all detected objects, but can reduce a calculation amount by detecting the specific area only for the main object after the main object determination processing in step S403.

Figure 11:
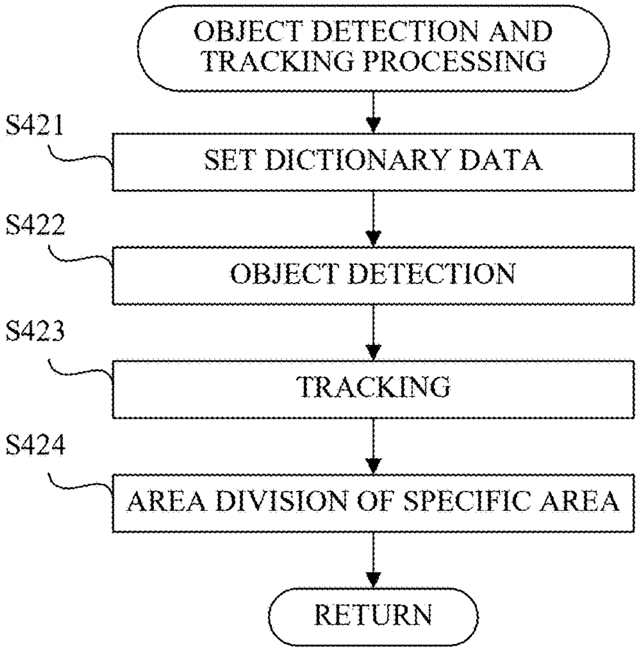
FIG. 11 is a flowchart of object detection and tracking processing according to this embodiment.

When the processing of step S424 in FIG. 11 is completed, the camera MPU 125 ends the object detection and tracking processing subroutine, and proceeds to step S404 in FIG. 11.

Subroutine of Flicker Determination

Figure 13:
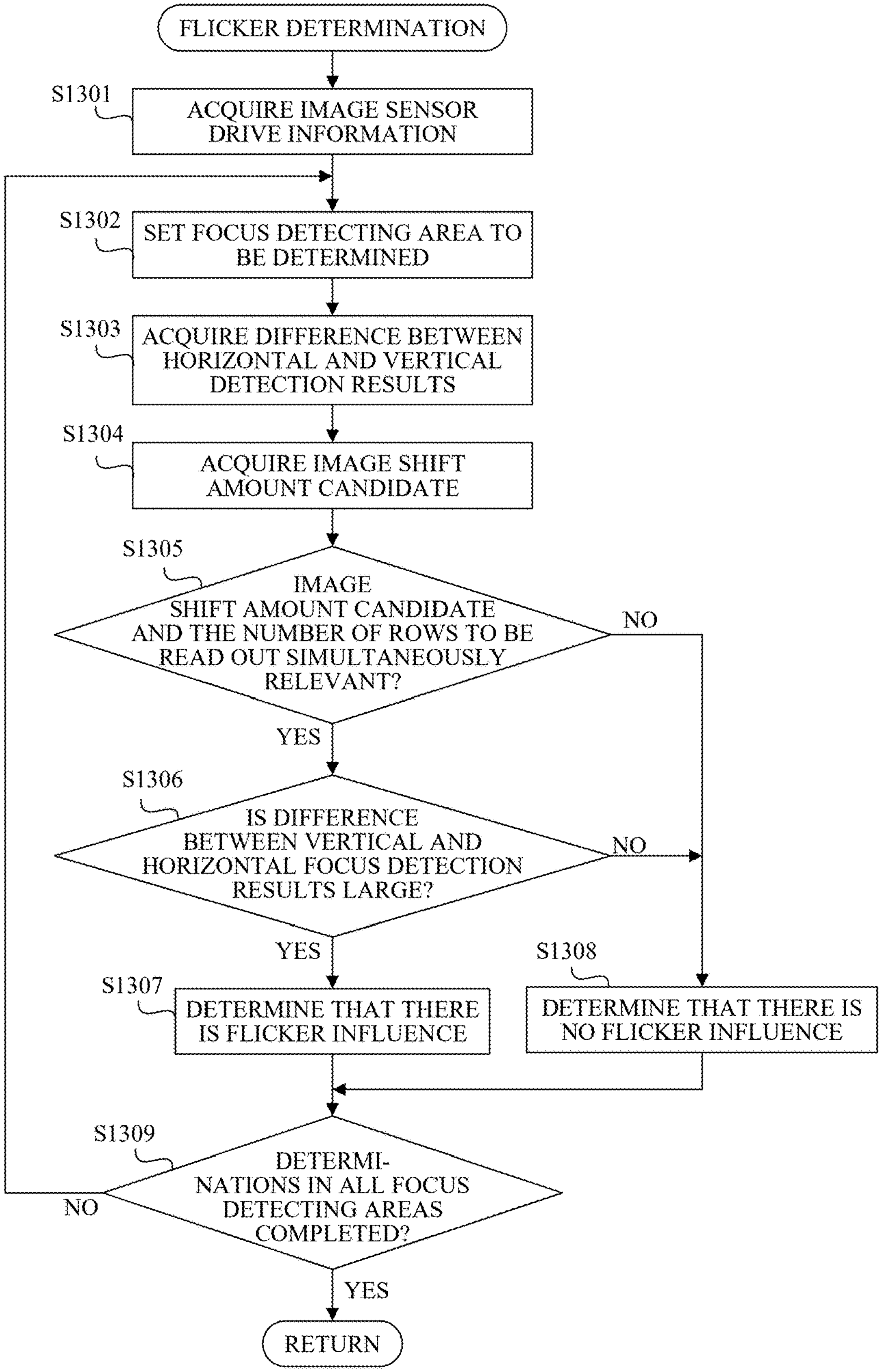
FIG. 13 is a flowchart of a flicker determination according to this embodiment.

Next, a subroutine of the flicker determination executed by the camera MPU 125 in step S404 of FIG. 10 will be described with reference to FIG. 13.

First, in step S1301, the camera MPU 125 acquires information (image sensor drive information) on the driving of the image sensor 122 performed in step S1. The image sensor 122 according to this embodiment selects from a variety of drive methods according to the luminance of the imaging environment and whether the recorded image is a still image or a moving image. In order to read out a signal on the screen within the time permitted by a frame rate (a drive rate of the image sensor) which is set based on the luminance of the imaging environment and the user's setting, the rows to be read out are thinned out or a signal from a plurality of rows are read simultaneously. In step S1301, regarding the driving of the image sensor, information on a vertical focus detection result (image shift amount) is acquired, which occurs when flicker occurs, which is determined from the number of rows to be thinned out and the number of rows being simultaneously read out. This embodiment determines whether flicker has occurred in the imaging environment using the degree of coincidence between the acquired information and the calculation result by the phase-difference AF unit 129 as the image shift amount in the actual vertical focus detection. Details will be described later.

Figure 10:
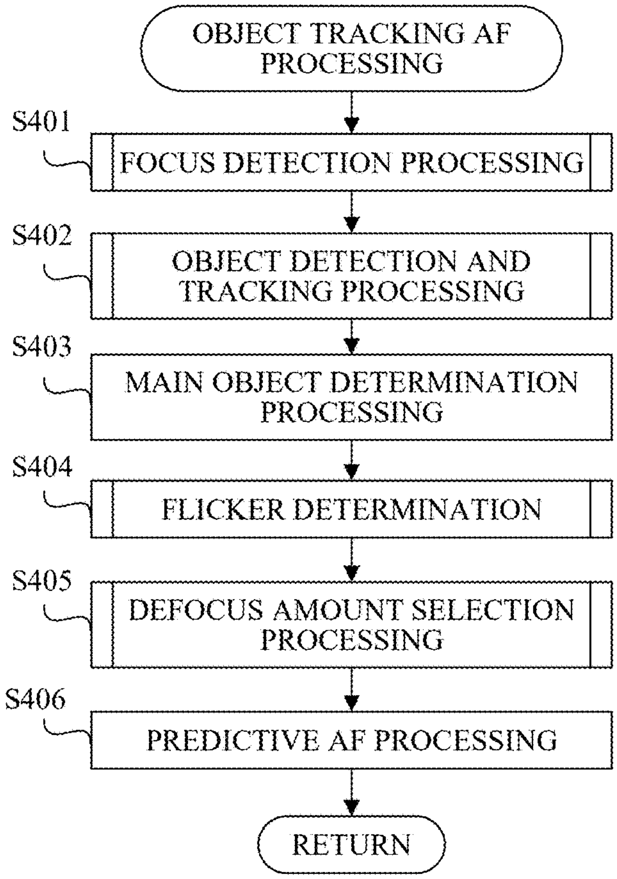
FIG. 10 is a flowchart of object tracking autofocus (AF) processing according to this embodiment.

Next, in step S1302, the camera MPU 125 sets a focus detecting area for performing the flicker determination in the defocus map calculated in step the S401 of FIG. 10. This embodiment sequentially determines 24 areas that constitute the vertical defocus map. Then, in step S1303, the camera MPU 125 acquires the horizonal focus detection result and the vertical focus detection result of the focus detecting area set in step S1302, and calculates a difference between them. This processing is performed because in a case where the vertical focus detection result contains an error due to the influence of flicker, the difference between the vertical and horizonal focus detection results may increase.

Next, in step S1304, the camera MPU 125 acquires an image shift amount candidate in the vertical focus detection. In order to explain the image shift amount candidate, the correlation calculation for performing the focus detection in step S401 will be described.

In this embodiment, a pair of signals used for the vertical focus detection will be referred to as an A-image signal and a B-image signal. The first, second, etc. outputs of the A-image signal in each row within the focus detecting area will be referred to as A(1), A(2), etc., and similarly, the first, second, etc. outputs of the B-image signal will be referred to as B(1), B(2), etc. Thus, 300 A-image (B-image) signals generated in sequence are concatenated to generate a pair of image signals. In the correlation calculation, a correlation amount is calculated while the positions of the paired image signals are shifted relative to each other, and a shift amount at a position where the correlation is highest (the shape of the paired image signals has the highest degree of agreement) is detected as an image shift amount. For example, correlation amount COR(h) can be calculated by the following equation (1):

$$COR(h) = \sum_{j=1}^{W1} |A(j + hmax - h) - B(j + hmax + h)| \quad (-hmax \le h \le hmax) \tag{1}$$

In equation (1), W1 corresponds to the number of data within the field, and hmax corresponds to the number of shift data. After calculating the correlation amount COR(h) for each shift amount h, the phase-difference AF unit 129 calculates the shift amount h that maximizes the correlation between the A-image and the B-image, i.e., the value of the shift amount h that minimizes the correlation amount COR (h). The shift amount h that is used in calculating the correlation amount COR(h) is an integer, but in a case where the shift amount h that minimizes the correlation amount COR(h) is calculated, in order to improve the accuracy of the defocus amount, the interpolation processing or the like is performed to determine a value (real value) in sub-pixel units. This embodiment calculates the shift amount at which the sign of the difference value of the correlation amount COR changes as the shift amount h (sub-pixel unit) that minimizes the correlation amount COR(h).

First, the phase-difference AF unit 129 calculates difference value DCOR between correlation amounts according to the following equation (2):

$$DCOR(2 \times h) = COR(h+1) - COR(h-1) \tag{2}$$

Then, using the difference value DCOR between correlation amounts, the phase-difference AF unit 129 obtains a shift amount dh1 at which the sign of the difference amount changes. Where h1 is a value of h just before the sign of the difference amount changes, and h2 (h2=h1+1) is a value of h after the sign changes, the phase-difference AF unit 129 calculates the shift amount dh1 according to the following equation (3):

$$dh1 = (h1 + |DCOR1(h1)|/|DCOR1(h1) - DCOR1(h2)|) \times 2 \tag{3}$$

Thus, the phase-difference AF unit 129 calculates the shift amount dh1 that maximizes the correlation between the A-image and B-image of the first signal in sub-pixel units, and then ends the processing. The method for calculating the shift amount (phase difference) between two one-dimensional image signals is not limited to the method described here, and an arbitrary known method can be used. As a result of performing the above correlation calculation, a plurality of shift amounts which change the sign of the difference value of the correlation amount COR may be calculated. In the normal focus detection, a shift amount that maximizes the difference value is selected and the focus detection is performed, but in step S1304, a plurality of calculated shift amounts are acquired as image shift amount candidates. A method for using the image shift amount candidates will be described in detail later.

Next, in step S1305, the camera MPU 125 determines whether there is a correlation between the image shift amount candidate of step S1304 and the information on the result of the vertical focus detection (image shift amount) that occurs when flicker has occurred regarding the drive method of the image sensor acquired in step S1301. In a case where the image shift amount candidate value acquired in step S1304 or its difference is close to the image shift amount acquired in step S1301 within a predetermined value, the flow proceeds to step S1306; otherwise, the flow proceeds to step S1308.

In step S1306, the camera MPU 125 determines the magnitude of the difference between the vertical and horizontal focus detection results acquired in step S1303. In a case where the difference is large, the flow proceeds to step S1307, and in a case where the difference is small, the flow proceeds to step S1308. In step S1307, since the set focus detecting area has an error in the vertical focus detection result due to flicker, the camera MPU 125 determines that there is flicker influence. On the other hand, in step S1308, the camera MPU 125 determines that the set focus detecting area is less affected by flicker on the vertical focus detection result.

After step S1307 or S1308, the flow proceeds to step S1309, where the camera MPU 125 determines whether the flicker determination has been completed in all focus detecting areas. In a case where the flicker determination has not been completed, the flow returns to step S1302 and the above processing is repeated. In a case where the flicker determination has been completed, the processing of this subroutine is completed, and the flow proceeds to step S405.

Drive Method of Image Sensor and Flicker Influence on Vertical Focus Detection

Referring now to FIG. 14A to FIG. 16D, a description will be given of a mechanism by which an error occurs in the vertical focus detection due to flicker along with the drive method of the image sensor.

Flicker, which occurs in illumination, digital signage, etc., is a phenomenon in which light blinking repeats over time at an invisible frequency. On the other hand, an image sensor using the slit rolling method accumulates and reads out signals from each row sequentially over time. In a case where a slit rolling type image sensor is exposed in an environment having flicker (flicker environment), the signal of each row increases or decreases due to the flicker influence caused by a difference in accumulation time of each row. This disclosure also sequentially reads the focus detecting signals for each row, but the paired signals that are used for the horizonal focus detection use signals from the same row, and are therefore affected by flicker to the same extent, so the influence on the focus detection results is small. On the other hand, the pair of signals that are used for the vertical focus detection are subject to flicker within the pair of signal sequences because the signal sequence forming direction coincides with the readout direction of the slit rolling method.

Figure 14A:
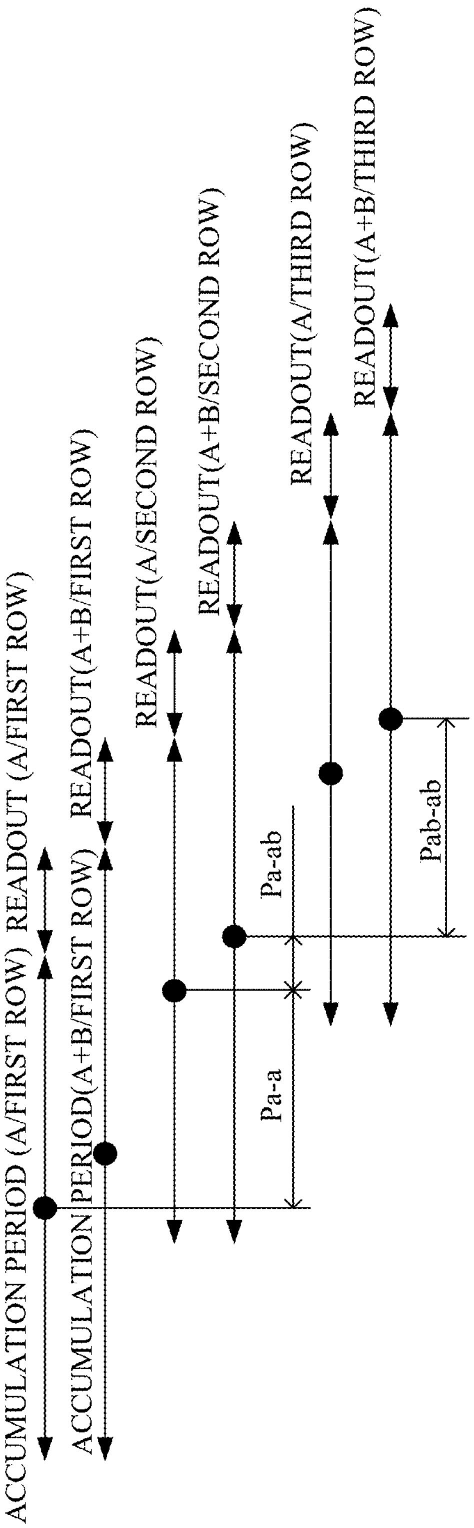
FIGS. 14A, 14B, and 14C explain the influence of flicker on a pair of signals for vertical focus detection according to this embodiment.
Figure 14B:
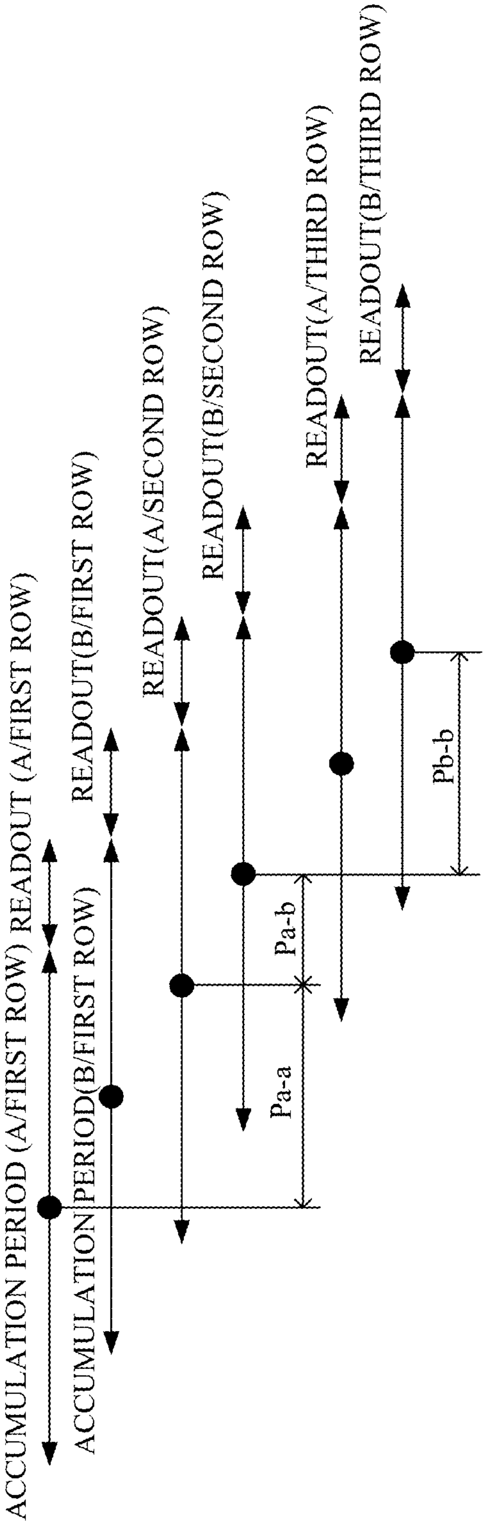
Figure 14C:
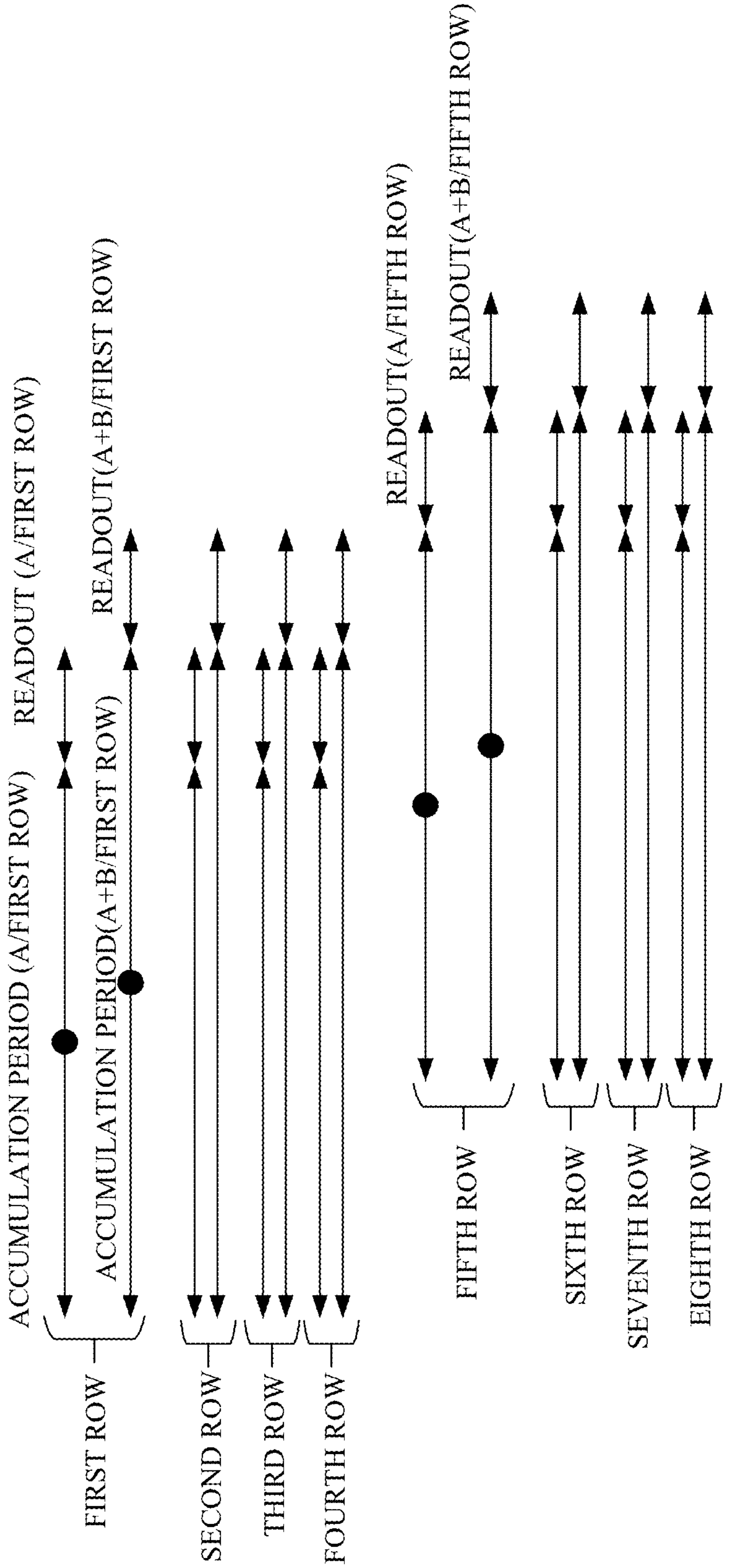

FIGS. 14A, 14B, and 14C illustrate the flicker influence on a pair of signals in the vertical focus detection. FIG. 14A illustrates the passage of time horizontally from left to right, and illustrates the timing of accumulation and readout of a focus detecting signal (A-image) and an imaging signal ((A+B)-image) for each row of the image sensor on the time axis. As described with reference to FIG. 2B, the A-signal and the (A+B)-signal are output for each row, and the diagram in the upper two rows in FIG. 14A illustrates the accumulation period and the readout period.

After the PDA 211 and the PDB 212 are reset, accumulation of the A-signal and the (A+B)-signal is started, and as soon as accumulation of the A-signal is completed, the voltage is read out. After the readout of the A-signal is completed, the accumulation of the (A+B)-signal is completed and the voltage is read out. Similarly, the signal of the second row is read out. The time difference between the accumulation period of the A-signal in the first row and the accumulation period of the A-signal in the second row is considered to be a difference in the centers of the accumulation periods, so the interval is Pa-a. The interval between the accumulation period of the (A+B)-signal in the first row and the accumulation period of the (A+B)-signal in the second row is Pab-ab. As described above, in the flicker environment, luminance changes over time, and thus the signal outputs of the first and second rows change over time for Pa-a and Pab-ab. A difference between the accumulation periods of the A-signal and the (A+B)-signal is indicated as Pa-ab.

In the flicker environment, the A-signal and the (A+B)-signal have a difference of Pa-ab in the accumulation period for each row. Due to the difference of Pa-ab, the waveforms of the A-signal and the (A+B)-signal have an image shift amount due to the flicker influence. Due to the difference in the accumulation period between the A-signal and the (A+B)-signal, the waveform of the B-signal is shifted horizontally from the waveform of the A-signal by Pa-ab/Pa-a pixel. For example, as illustrated in FIG. 14A, the accumulation start time for each row is shifted by a time corresponding to the sum of the readout periods of the A-signal and the (A+B)-signal. In a case where the readout periods of the A-signal and the (A+B)-signal are equal, the waveform of the B-signal is shifted horizontally from the waveform of the A-signal by Pa-ab/Pa-a pixel=¼ pixel.

FIG. 14B illustrates a case where the control regarding the exposure of each row is different from that of FIG. 14A, and the A-signal and the B-signal are read out in each row. This illustrates a case where the accumulation start times of the A-signal and the B-signal in the first row are shifted by the readout period of the A-signal. As in FIG. 14A, due to a difference in accumulation period between the A-signal and the (A+B)-signal, the waveform of the B-signal is shifted horizontally from the waveform of the A-signal by Pa-ab/Pa-a pixel. For example, suppose that the accumulation start times for the A-signal on the first row, the B-signal on the first row, the A-signal on the second row, etc. are shifted by the times corresponding to the readout period of the A-signal on the first row, the readout period of the B-signal on the first row, the readout period of the A-signal on the second row, etc. In a case where the readout periods of the A-signal and the B-signal are equal, the waveform of the B-signal is shifted horizontally from the waveform of the A-signal by Pa-ab/Pa-a pixels=½ pixel.

Figure 15A:
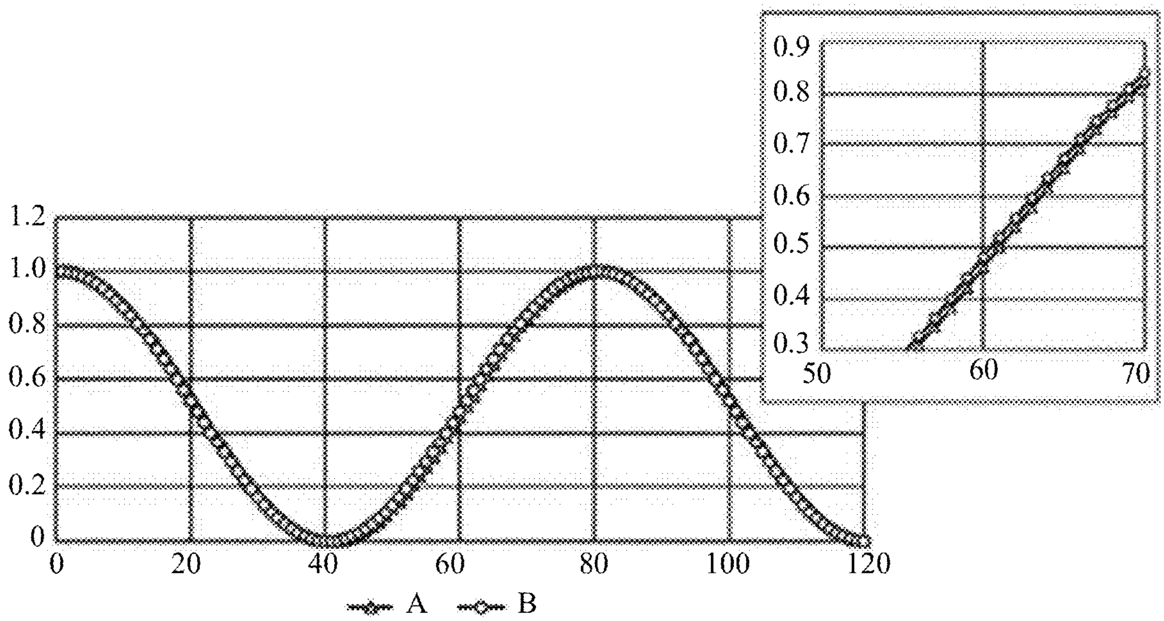
FIGS. 15A, 15B, 15C, and 15D illustrate waveforms when flicker occurs according to this embodiment.
Figure 15B:
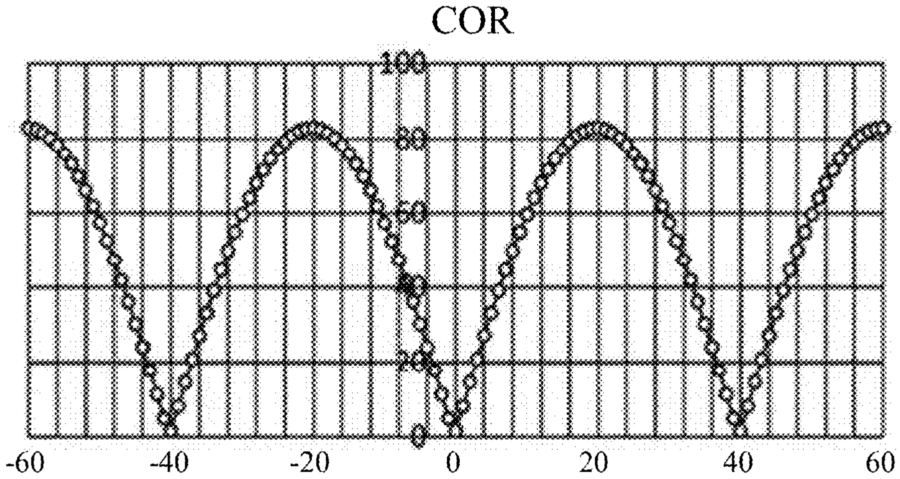

FIG. 15A illustrates the A-signal and the B-signal corresponding to the case of FIG. 14B. A horizontal axis (abscissa) indicates a pixel number, and a vertical axis (ordinate) indicates a signal output normalized by the maximum value. The rippling output of each pixel indicates flicker over time. A partially enlarged view is illustrated in the upper right corner of FIG. 15A, and it can be understood that the waveforms of the A-signal and the B-signal are slightly shifted. As described in step S1304, FIG. 15B illustrates a result of calculating a correlation amount. A horizontal axis indicates a positional shift amount between the A-signal and the B-signal, and a vertical axis indicates a correlation amount which indicates the magnitude of correlation. In FIG. 15B, it can be understood that the correlation amount has a minimum value when the shift amount is in the vicinity of ±40 pixels and 0 pixel.

Figure 15C:
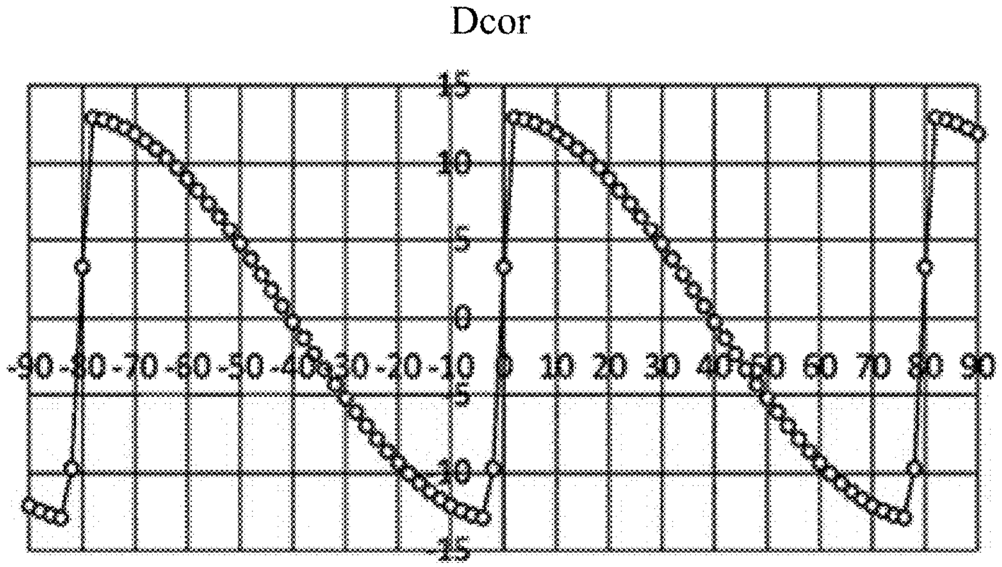
Figure 15D:
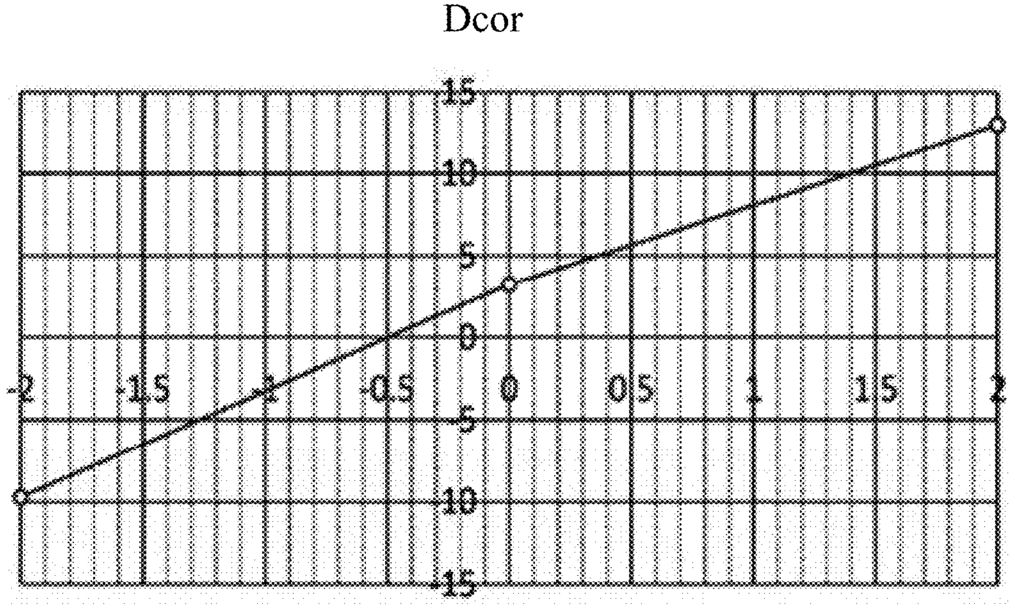

FIG. 15C illustrates a calculated difference value DCOR between correlation amounts. A horizontal axis indicates a shift amount, and a vertical axis indicates a difference value between correlation amounts. Shift amount that cross the horizontal axis in an upward sloping manner to the right indicate that they are near ±80 pixels and 0 pixel. FIG. 14D illustrates an enlarged view near the pixel with a shift amount of 0. In this embodiment, candidate dh1 for the image shift amount indicates −0.5 pixel, which is an intersection with the horizontal axis. Similarly, −80.5 pixel and +79.5 pixel are candidates for the image shift amount.

An image shift amount candidate, −0.5 pixel, is a pixel shift amount which occurs when the readout in FIG. 14B is performed in the flicker environment. This embodiment obtains information on the readout method illustrated in FIG. 14A or FIG. 14B as information on the driving of the image sensor 122 in step S1301, thereby obtaining the image shift amount caused by flicker. For example, in the case of the drive method of FIG. 14B, information on −0.5 pixel is acquired.

On the other hand, the image shift amounts at −80.5 pixel and +79.5 pixel are image shift amounts offset by −0.5 pixel caused by the influence of flicker from 80 pixel, which is the period during which flicker occurs, as understood from FIG. 15A. Canceling the image shift amount caused by the flicker influence can calculate that the period during which flicker occurs is 80 pixels, and the frequency of flicker can be calculated from the information on the readout time for each row.

In step S1305, it is determined whether the image shift amount of −0.5 pixel in a case where flicker occurs is included in the image shift amount candidates obtained in step S1304, based on the readout information on the image sensor 122 in FIG. 14B. If included, it is determined that the environment is likely to be a flicker environment, and the flow proceeds to step S1305. In step S1306, in order to exclude cases where the defocus state of the object matches the image shift amount detected in the flicker environment, a difference with the horizonal focus detection result, which is less affected by flicker, is confirmed. In a case where a difference between the horizonal focus detection result and the vertical focus detection result is small, it is determined that the defocus state of the object can also be obtained from the vertical focus detection result. On the other hand, if the difference is large, it is determined that the vertical focus detection result is affected by flicker.

Due to the determination in step S1306, the focus detection using the vertical focus detection result can be performed in a wider range of imaging environments, and highly accurate focusing can be performed. On the other hand, the determination in step S1306 may be omitted to minimize the influence of flicker on the vertical focus detection result.

Figure 16A:
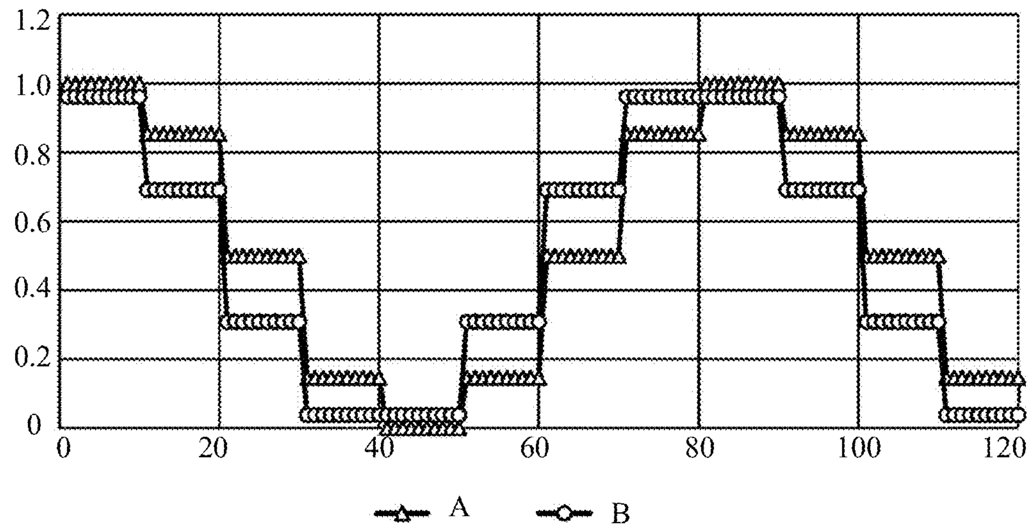
FIGS. 16A, 16B, 16C, and 16D illustrate waveforms when flicker occurs according to this embodiment.

FIG. 14C illustrates simultaneous reading of a plurality of rows of the image sensor 122. FIG. 14C illustrates simultaneous reading of four rows, but the number of simultaneously readable rows is not limited to this. Even when a plurality of rows are read out simultaneously, there is a difference between the readout period of the A-signal and the readout period of the (A+B)-signal, and there is a difference in the readout period for each block of rows (one block has four rows in FIG. 14C). For easy understanding, FIG. 16A illustrates the waveforms of the A-signal and the B-signal when 10 rows are read out simultaneously. In addition to the flicker influence, it can be understood that steps occur every 10 rows. In a case where the above correlation calculation is performed for such a waveform, a section of the shift amount having a small change in the correlation amount occurs, and a highly accurate image shift amount cannot be obtained, so digital filter processing is performed.

Figure 16B:
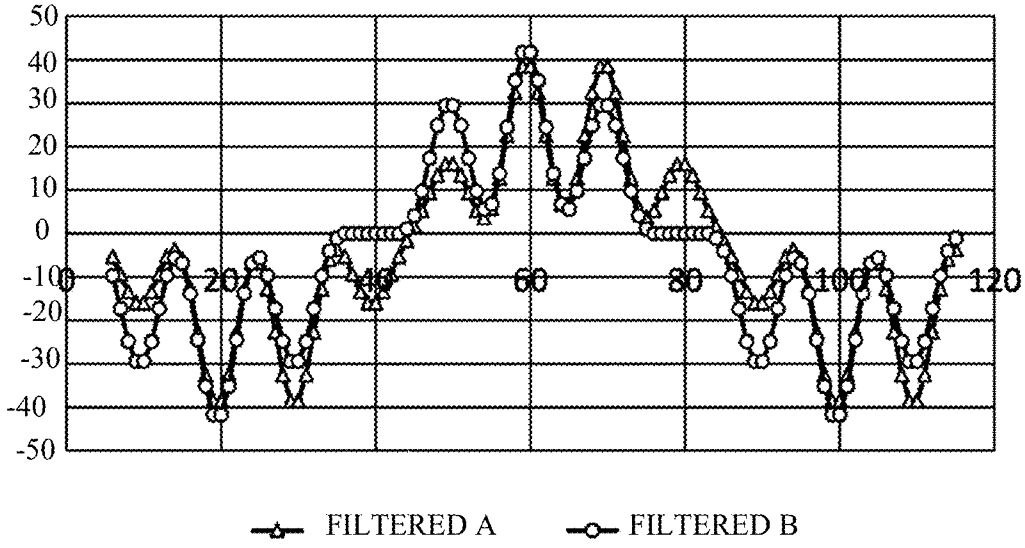
Figure 16C:
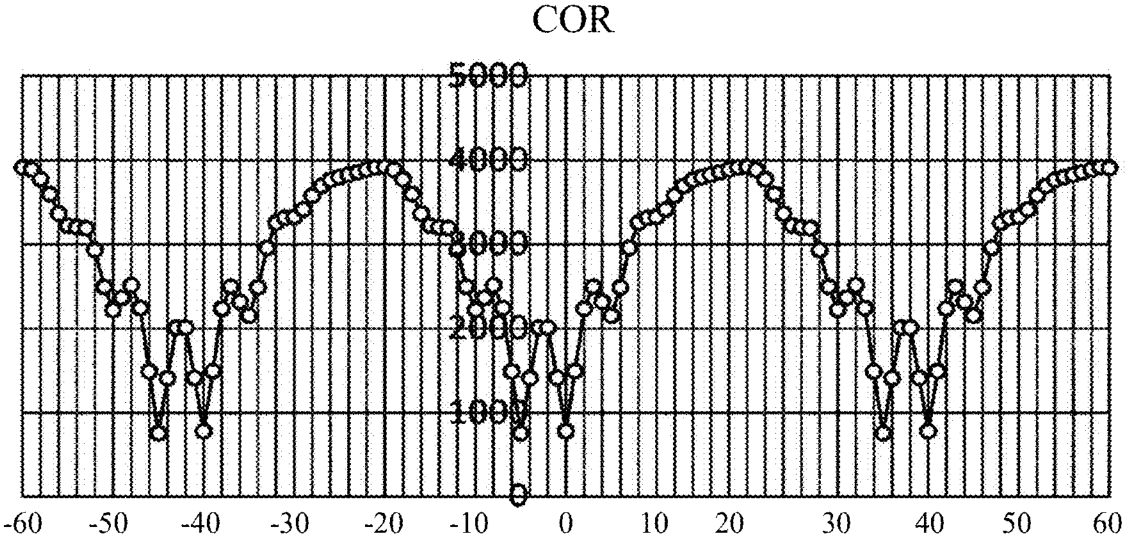
Figure 16D:
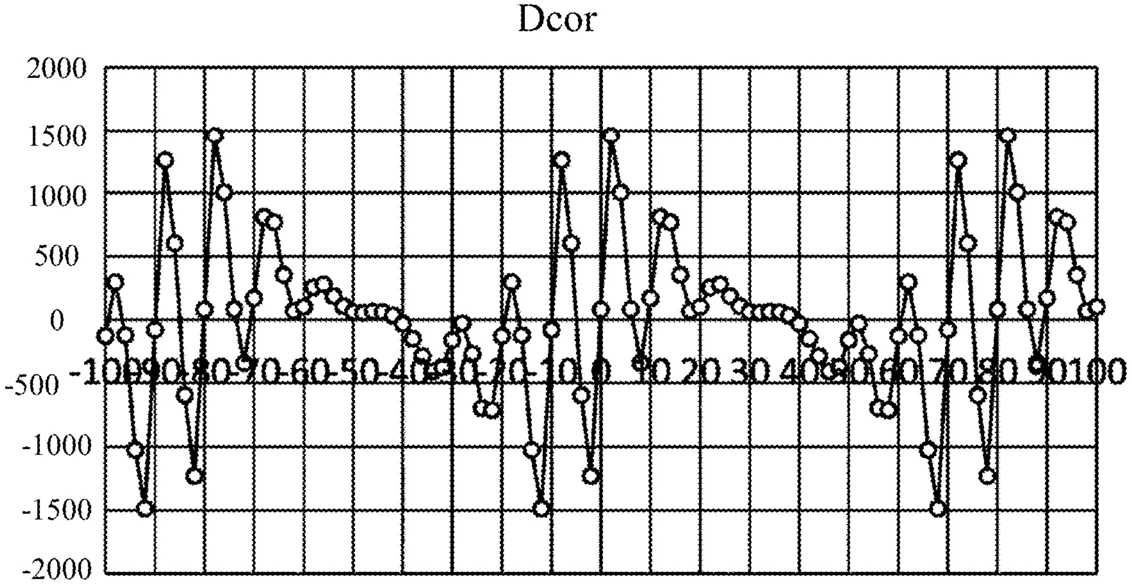

FIG. 16B illustrates results of performing predetermined filter processing (−4, −11, −21, −28, −28, −17, 0, 17, 28, 28, 21, 11, 4). As in the correlation calculation processing described above, FIG. 16C illustrates a correlation amount COR, and FIG. 16D illustrates the difference value DCOR between correlation amounts. It is understood that the difference value DCOR between correlation amounts rises to the right and intersects the horizontal axis at approximately −90, −80, −10, 0, +70, and +80 pixels. Here, a shift amount of −10 pixel is an image shift amount caused by the influence of flicker when the image sensor 122 simultaneously reads out 10 rows. Similarly to the case of reading out every one row at a time described above, in step S1301, acquired information regarding the driving of the image sensor 122 is simultaneous reading of 10 rows and an image shift amount caused by flicker of approximately −10 pixel.

Thereafter, the determinations are performed in steps S1305 and S1306 as described above. Similarly, the frequency of flicker can be calculated from the shift amounts of +80 pixels and 0 pixel. It is also understood that the image shift amount candidates of −90 pixel and +70 pixel are image shift amounts resulting from the combination of the frequency of flicker and the influence of flicker caused by the readout method of the image sensor.

When a plurality of rows are read out simultaneously, an image shift occurs due to the difference Pa-ab between the readout periods of the A-signal and the (A+B)-signal, and an image shift occurs due to waveform steps that occur every multiple row. In a case where the influence of waveform steps occurring every multiple row is sufficiently reduced by the above digital filter processing, the former influence of the difference Pa-ab between the readout periods of the A-signal and the (A+B)-signal increases. For example, in a case where the waveform steps occurring every four rows are eliminated by digital filter processing in simultaneous four-row readout in FIG. 14C, an image shift of Pa-ab/Pa-a×4 pixels=1 pixel occurs This is a case where for a time equivalent to the sum of the readout periods of the A-signal and the (A+B)-signal, an accumulation start every four rows and a readout shift occur, and the readout periods of the A-signal and the (A+B)-signal are equal. On the other hand, in the cases of FIGS. 16A, 16B, 16C, and 16D, when 10 rows are simultaneously read out, the waveform steps occurring every 10 rows have not disappeared due to the digital filter processing. Therefore, an image shift amount of −10 pixel is calculated as the image shift amount candidate.

Thus, a value of an image shift amount at which the focus detection result is affected by flicker is previously calculated by a combination of the drive information on the image sensor 122 acquired in step S1301 and the digital filter processing for the correlation calculation. Thereby, the image shift amount candidate can be compared in step S1304.

The influence on the A-signal, B-signal, and vertical focus detection result under the flicker environment discussed with reference to FIG. 14A to FIG. 16D correspond to a case where the object has no contrast and flicker occurs. In reality, the contrast including the defocus state of the object is superimposed on the A-signal and the B-signal. Therefore, in a case where the contrast of the object is low and a brightness difference of flicker is large, the influence of flicker on a vertical focus detection result increases, and a value close to an image shift amount described above occurs.

On the other hand, in a case where the contrast of the object is high or in a case where the brightness difference of flicker is small in a mixed light environment with other flicker-free light sources, the influence of flicker on a vertical focus detection result is reduced, and a vertical focus detection result indicating a defocus state of an object can be obtained. Therefore, the determination in step S1305 in FIG. 13 may assume that an image shift amount has an error to some extent under the flicker environment due to the readout method of the image sensor 122 and the digital filter. For example, in FIGS. 15A, 15B, 15C, and 15D, in a case where an image shift amount candidate for the vertical focus detection in a range of −0.5 pixel ±0.25 pixel is obtained, a method of determining Yes can be considered.

As described above, the vertical focus detection result can contain errors under the flicker environment, but determining whether or not it can be used according to the drive information on the image sensor can avoid using less accurate vertical focus detection result. As a result, highly accurate focus detection can be performed.

This embodiment determines whether there is flicker influence for each focus detecting area. Flickers may occur due to the illumination in the entire imaging environment, or may occur only in a part of the imaging environment, such as a digital signage. As in this embodiment, by determining whether there is flicker influence for each focus detecting area, more vertical focus detection results can be used, and more accurate focus detection can be achieved.

On the other hand, as described above, the influence of flicker on the vertical focus detection result varies according to the contrast of the object, including defocus. Therefore, a determination may be incorrect when only a single focus detecting area is used. Therefore, one conceivable method previously determines a threshold value, and uses none of the vertical focus detection results in a case where it is determined that there is flicker influence in a number of focus detecting areas greater than the threshold value. In a case where there is an uneven distribution of focus detecting areas affected by flicker, another conceivable method does not use the vertical focus detecting area in only a part of the imaging range. These methods can more reliably reduce errors due to flicker contained in the vertical focus detection result.

Defocus Amount Selection Processing

Figure 17:
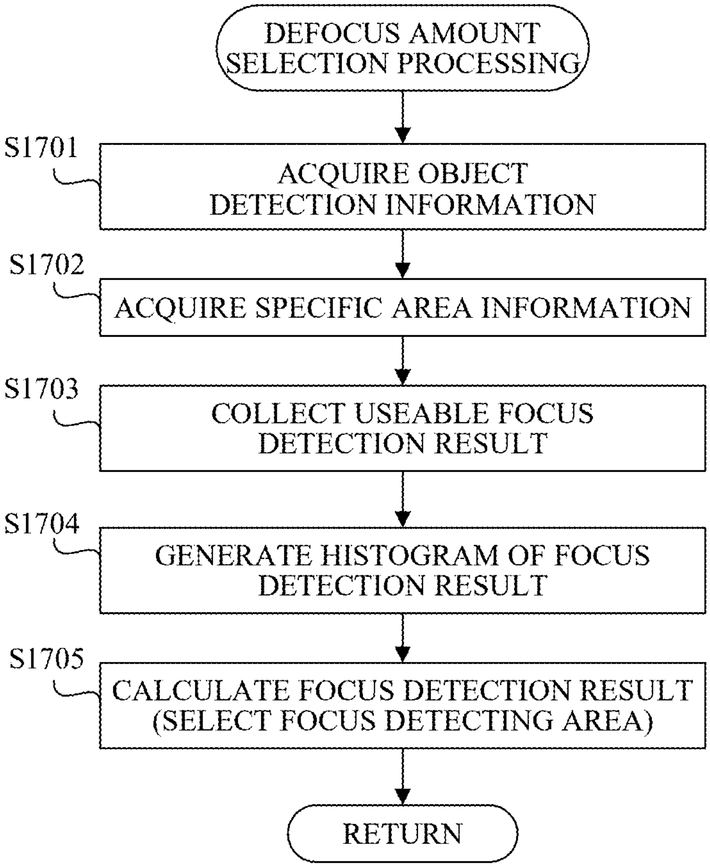
FIG. 17 is a flowchart of defocus amount selection processing according to this embodiment.

Referring now to FIG. 17 to FIG. 20D, a description will be given of a subroutine of the defocus amount selection processing subroutine (step S405 in FIG. 10). FIG. 17 is a flowchart illustrating the defocus amount selection processing.

First, in step S1701, the camera MPU 125 acquires the object detection position and size, which are object detection information detected by the object detector 130. Next, in step S1702, the camera MPU 125 acquires specific area information detected by the object detector 130. In this embodiment, the specific area information is a face area excluding an occluded area and a background area. The processing using the specific area information will be described later with reference to FIGS. 19A, 19B, 19C, and 19D.

Next, in step S1703, the camera MPU 125 collects usable focus detection results. The collection of the usable focus detection results is processing of collecting defocus amounts as usable focus detection results in the defocus amount selection processing from the horizonal defocus map and the defocus amounts of the horizonal defocus map. More specifically, whether or not to allow all vertical focus detection results to be used is determined according to whether the number of focus detecting areas determined to be affected by flicker in the flicker determination processing of FIG. 13 described above is equal to or greater than a predetermined number. The reason why all vertical focus detection results are considered is that in a case where the predetermined number or more shows that there is flicker influence, there is a high possibility that the vertical focus detection results contain errors due to the flicker influence.

In a case where the contrast of the object is low, the ISO speed is high, or the exposure is darker than the proper exposure, the focus detection result is more erroneous. Thus, by determining the reliability of the focus detection result from a difference in the correlation amount in the correlation calculation processing described above, it may be determined not to be used for the focus detection result. By thinning out or adding the rows to be read out according to the drive method of the image sensor 122, the accuracy of the vertical focus detection result may be inferior to that of the horizonal focus detection result. Thus, in the case of an imaging mode using such a drive method, it may be determined not to use the vertical focus detection.

Next, in step S1704, the camera MPU 125 generates a histogram using defocus amounts, which are focus detection results that have been made usable in step S1703. The histogram is generated by determining which focus detection result of a focus detecting area is to be used, based on the object detection information and specific area information. As illustrated in the focus detecting area setting processing in step S2201 in FIG. 22 described above, the histogram is generated using the defocus map included in the object area. FIGS. 20A, 20B, 20C, 20D, 20E, and 20F illustrate histograms of the focus detection results.

Figure 20A:
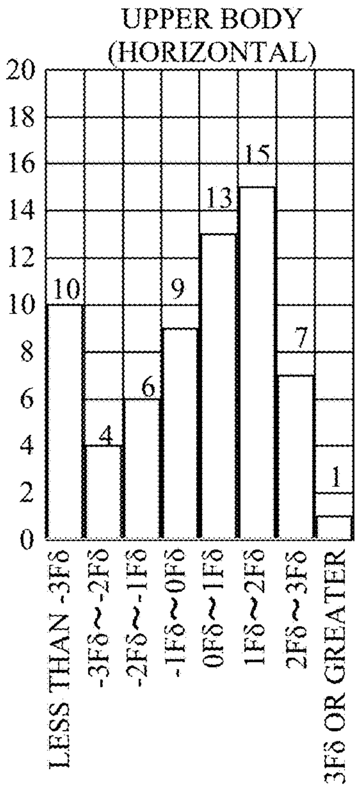
FIGS. 20A, 20B, 20C, 20D, 20E, and 20F illustrate histograms of defocus maps according to this embodiment.
Figure 20B:
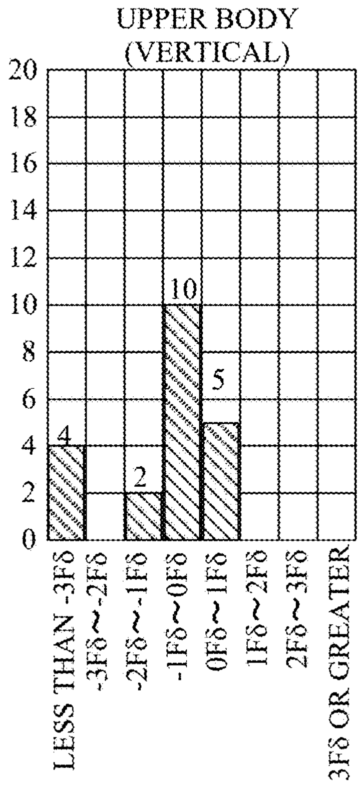
Figure 20C:
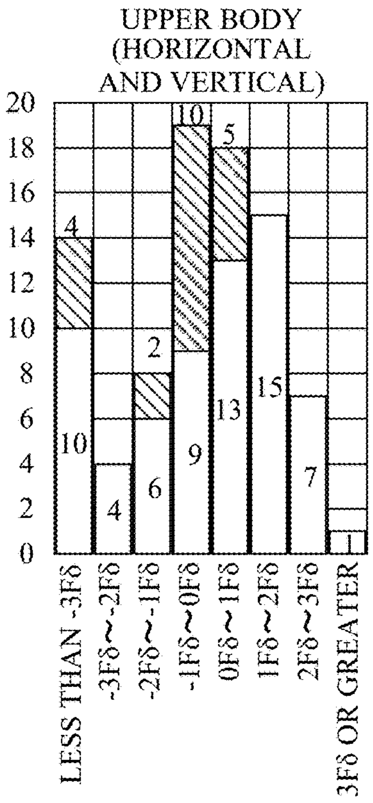

Referring now to FIGS. 20A, 20B, and 20C, a description will be given of a method of generating a histogram using a defocus amount in an upper body detecting area. FIG. 20A is a histogram generated from a defocus amount of a horizonal defocus map within the upper body detecting area of the person in FIG. 18B. FIG. 20B is a histogram generated from a defocus amount of a vertical defocus map within the upper body detecting area of the person in FIG. 18C. FIG. 20C is a histogram generated by combining the defocus amounts of the horizonal defocus map and the vertical defocus map within the upper body detecting area of the person in FIGS. 18B and 18C. The horizontal axis of the histogram represents classes which divide the defocus amount into certain ranges, and the vertical axis of the histogram is the frequency. In this example, the positive side of the defocus amount is set to a close distance (near) side and a negative side of the defocus amount is set to an infinity (far) side, and a defocus amount of a pupil region of a person is 0Fδ.

In the horizonal histogram in FIG. 20A, a histogram is generated for the entire upper body detecting area, which mainly includes the left side area of the upper body below the face, and thus the maximum frequency of the histogram is located on the short distance side. Therefore, in a case where a defocus amount is selected from a defocus amount range that results in the maximum value of the histogram frequency, a selected defocus amount is different from the pupil region of the person on which the user wishes to focus on.

In the vertical histogram in FIG. 20B, since the vertical defocus map is placed in the face detecting area, it does not include the left side area of the upper body below the face, and therefore the frequency of the histogram in the range near 0Fδ, which is a defocus amount of the pupil region, is maximum. However, due to the small number of focus detecting areas in the defocus map, it may be difficult to extract a location that maximizes the frequency under the condition that the defocus amount is likely to vary due to errors.

Accordingly, generating a histogram which combines the horizonal and vertical directions as illustrated in FIG. 20C can generate a histogram which uses more defocus amounts. Thus, it is possible to select a more suitable defocus amount in comparison with defocus-amount variations or an erroneous defocus amount. However, this is a defocus-amount histogram in the upper body detecting area, and thus it also includes the left side area of the upper body below the face. Thus, the frequency of the defocus-amount histogram increases in the ranges of −1Fδ to 0Fδ and 0Fδ to 1Fδ, and it becomes difficult to extract a defocus-amount range that maximizes the frequency of the histogram. As a result, depending on the defocus-amount variation, the defocus-amount range that maximizes the frequency of the histogram may fluctuate.

Accordingly, this embodiment uses the vertical defocus map in addition to the horizonal defocus map. A method of generating a histogram using the defocus amount in the face detecting area will be described with reference to FIGS. 20D, 20E, and 20F. An example will be given in which the defocus amount of the pupil region of a person is 0Fδ.

Figure 20D:
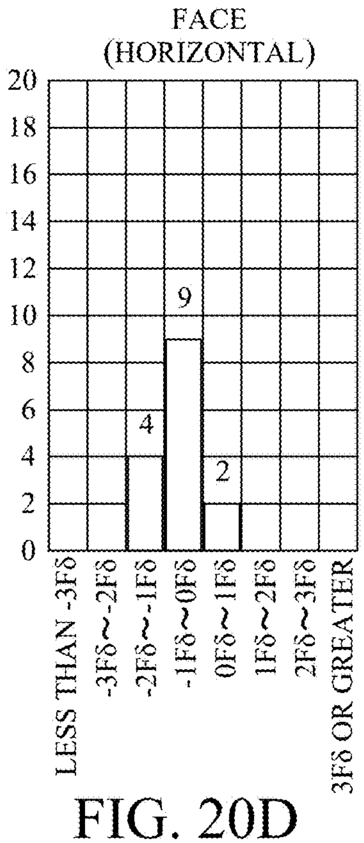

FIG. 20D is a histogram generated from a defocus amount of the horizonal defocus map within the person's face detecting area in FIG. 18B. Since the histogram based on the defocus amount is generated within the face detecting area, the frequency of the defocus-amount histogram becomes maximum in a range from −1Fδ to 0Fδ, which includes the defocus amount of the person's pupil region.

Figure 20E:
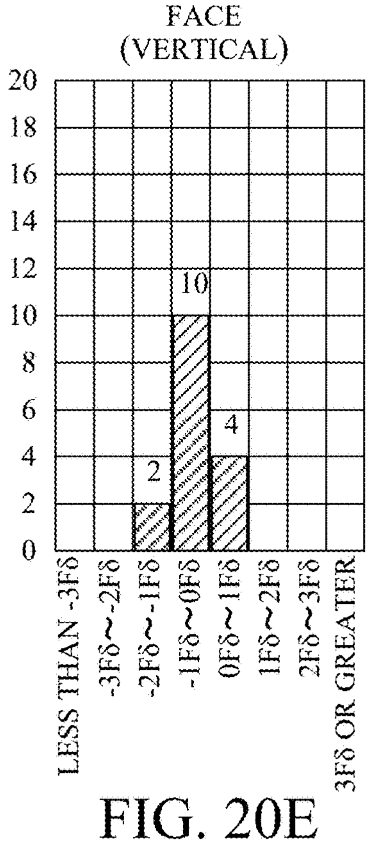

FIG. 20E is a histogram generated from a defocus amount of a vertical defocus map within the person's face detecting area of FIG. 18D. Since the histogram based on the defocus amount is generated within the face detecting area, the frequency of the defocus-amount histogram becomes maximum in a range from −1Fδ to 0Fδ, which includes the defocus amount of the person's pupil region.

Figure 20F:
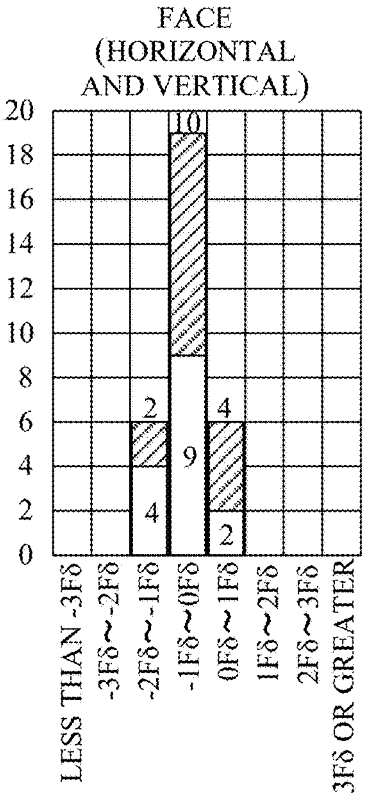

FIG. 20F is a histogram generated by combining the histograms of FIGS. 20D and 20E and thereby combining the defocus amounts of horizonal and vertical defocus amounts. Due to the histogram generated by combining the horizonal and vertical defocus amounts within the face detecting area, the frequency of the defocus-amount histogram in a range of −1Fδ to 0Fδ, which includes the defocus amount of the person's pupil region, becomes larger than the frequency of the defocus-amount histogram of only the horizonal or vertical defocus amount. Therefore, even if there is a defocus-amount variation or a defocus amount that causes perspective conflict with the background, they are less likely to be affected.

The defocus-amount histogram may be generatable using as many defocus amounts as possible in a narrow person detecting area. As illustrated in FIGS. 20D, 20E, and 20F, a histogram may be generated using defocus amounts of the horizonal and vertical defocus maps within the face detecting area. However, in a case where the area of the defocus map within the face detecting area is small, the number of defocus-amount data is small, so the frequency of the histogram using the defocus amount is low as a whole, and it becomes difficult to extract a range of defocus amounts where the frequency is maximum.

Accordingly, in generating the histogram, the number of necessary defocus-amount data or the detecting area of a person is determined, and it is determined whether the number of defocus-amount data is equal to or greater than a predetermined value or the detecting area of a person is equal to or greater than a predetermined value. In a case where it is less than the predetermined value, the detecting area for a person is expanded so that the number of defocus-amount data becomes equal to or greater than the predetermined value. There is a difference between the area of the horizonal defocus map and the area of the vertical defocus map. Thus, for example, a histogram of the defocus amount may be generated by using the horizonal defocus map for an upper body detecting area of a person, and the vertical defocus map for a face detecting area of the person.

Depending on the detecting area of the person, the horizonal defocus map may have a defocus amount. The vertical defocus map may have no defocus amount. In a case where only the horizonal defocus map has a defocus amount, the number of defocus-amount data may be twice or left as is, and in an area where both horizonal and vertical defocus maps are present, the number of defocus amounts may be left as is or may be halved and normalized. In this embodiment, the area of the horizonal defocus map is larger than the area of the vertical defocus map, but the area of the vertical defocus map may be larger than the area of the horizonal defocus map.

Next, in step S1705, the camera MPU 125 selects a focus detecting area using the histogram of defocus amounts, which is the focus detection result generated in step S1704, and selects a defocus amount corresponding to a focus detection result of that area. The defocus amount is selected from a range that maximizes the frequency of the defocus-amount histogram. There are a plurality of selection methods. For example, the selection method may be a method for selecting a defocus amount closest to the defocus amount that is the predictive AF processing result in step S406, a method for selecting a defocus amount in a focus detecting area that is close in position to the pupil detecting area, which is the detecting area for a person, or a method for selecting a defocus amount on the short distance side. The selection method may be a method for producing a defocus-amount histogram for each of a plurality of detecting areas, such as an upper body, a face, and an eye, and for selecting a defocus amount from ranges that maximize the frequencies of the histograms of the plurality of detecting areas, or a plurality of defocus amounts from the short distance side. The selection method may be a method for calculating a defocus amount by averaging defocus amounts in a range that maximizes the frequency of the defocus-amount histogram.

Figure 19A:
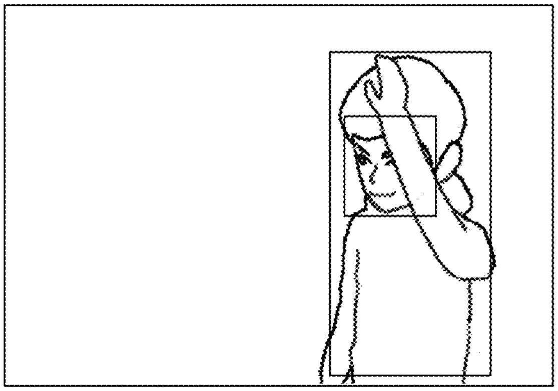
FIGS. 19A, 19B, 19C, and 19D illustrate a method of setting a defocus map according to this embodiment.
Figure 19B:
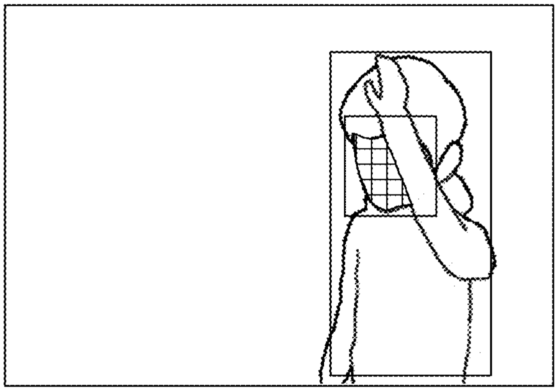

Next, processing using specific area information will be described with reference to FIGS. 19A, 19B, 19C, and 19D. FIGS. 19A, 19B, 19C, and 19D illustrate examples of the arrangement of defocus maps in a case where occlusion occurs. FIG. 19A illustrates an image of the moment when a person's face area is covered with an occluded area (arm), and the object detection information acquired in step S1701 is indicated by a rectangular frame. FIG. 19B illustrates the specific area (face area in this embodiment) acquired in step S1702 as a lattice frame, and indicates that a portion covered by the arm has not been detected as the specific area (face area). The specific area information (likelihood) obtained in step S1702 may be information which expresses whether or not it is a specific area with a binary output result of 1 or 0, or it may be information which expresses that the larger the value is, the higher the likelihood is in one byte, for example, 0 to 255. This embodiment uses the former method, assuming that 1 is output for the lattice frame area and 0 is output for other areas such as the arm.

Figure 19C:
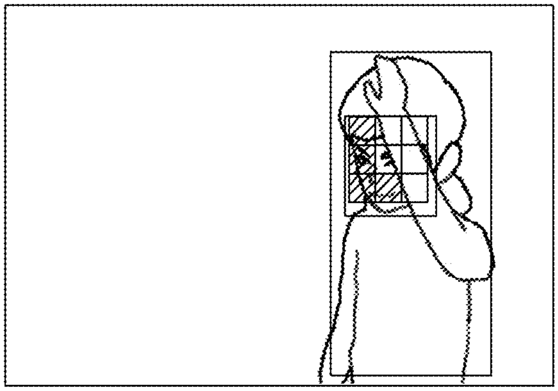

FIG. 19C illustrates effective areas as the specific area in the horizonal defocus map using diagonal lines by associating the 3×3-frame horizonal defocus map with the specific area. The determination as to whether or not it is effective may use a determination method of determining whether or not the proportion of the estimated area within each frame of the defocus map is equal to or greater than a certain value, for example, equal to or greater than 50%. The range within each frame may be determined based on parameters that are used for the correlation calculation, such as the shift amount that has been used to calculate the defocus amount.

Figure 19D:
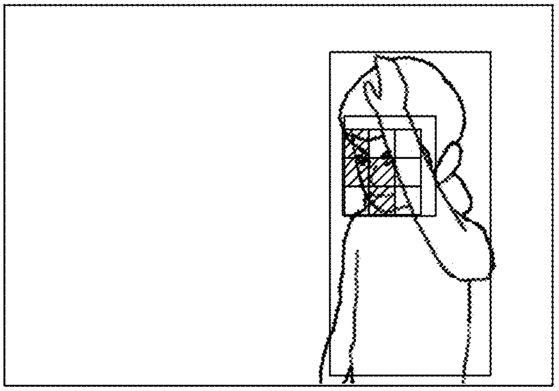

FIG. 19D illustrates effective areas as the specific area in the vertical defocus map using diagonal lines by associating the 3×3-frame vertical defocus map with the specific area. The determination as to whether or not it is effective may use a determination method similar to that of the horizonal defocus map, and thus a description thereof will be omitted.

Figure 21A:
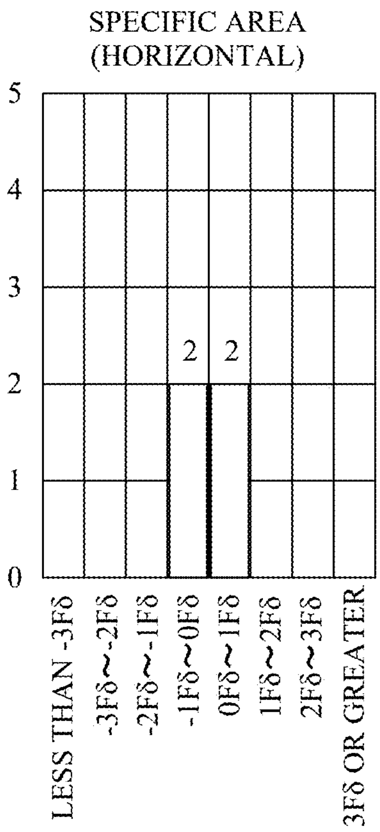
FIGS. 21A, 21B, and 21C illustrate histograms of defocus maps using specific area information according to this embodiment.
Figure 21B:
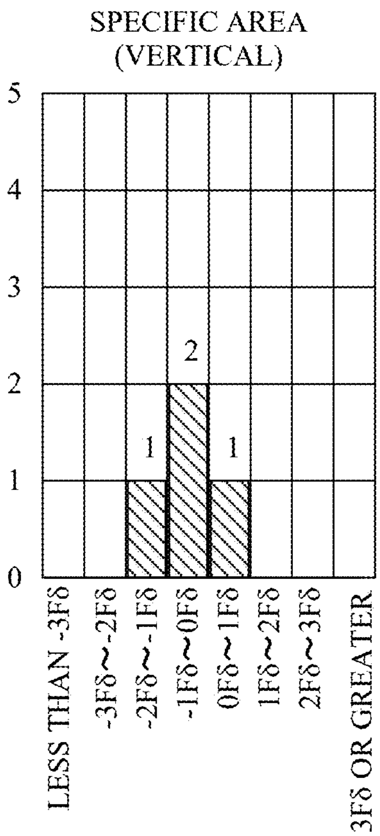
Figure 21C:
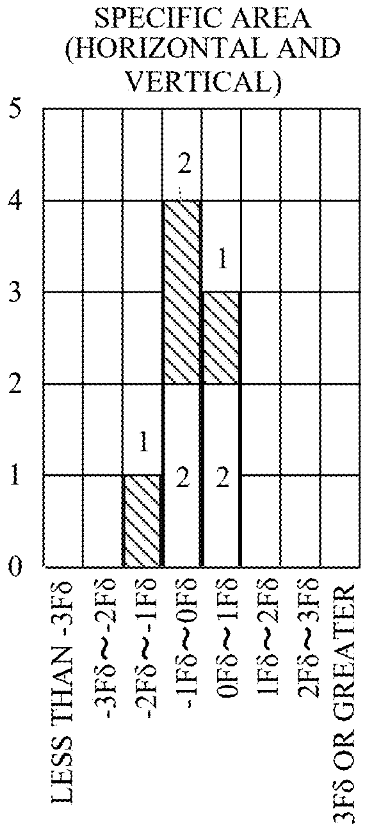

FIGS. 21A, 21B, and 21C are histograms generated from the defocus maps of FIGS. 19C and 19D. Since the 3×3-frame defocus map includes occluded areas, if a histogram is generated for the entire area, due to the influence of the occluded areas, a histogram peak is more likely to be detected on a short distance side of the face. On the other hand, generating the histogram only in the specific area as in this embodiment can reduce the influence of the occluded area, background area, and the like.

As described above, by generating the histogram only in the specific area, an effect of suppressing the influence of the occluded area can be expected. This embodiment has discussed the 3×3-frame defocus map, but is not limited to this example, and the number of frames can be freely set to N×M frames (N and M are integers equal to or greater than 2).

In this embodiment, the camera MPU 125 determines the first focus detecting area group for the first focus detection and the second focus detecting area group for the second focus detection. The camera MPU 125 changes at least one of the first focus detecting area group and the second focus detecting area group according to the object detection result by the object detector 130 (whether or not the entire area and local area have been detected, the center position of the entire area and the center position of the local area, etc.).

The object detector 130 may detect the first detecting area (the entire detecting area) of the object, and the second detecting area (the local detecting area) which is smaller than the first detecting area. The camera MPU 125 arranges the first focus detecting area group so as to include the center of the first detecting area, and arranges the second focus detecting area group so as to include the center of the second detecting area.

In a case where the object detector 130 may detect both the first detecting area of the object and the second detecting area, the camera MPU 125 may arrange the first focus detecting area group so as to include the center of the first detecting area, and arranges the second focus detecting area group so as to include the center of the second detecting area. In a case where the object detector 130 detects only one of the first detecting area and the second detecting area, the camera MPU 125 arranges the first focus detecting area group and the second focus detecting area group so as to include either the center of the detected first detecting area or the center of the detected second detecting area.

The camera MPU 125 may make the center of the first focus detecting area group and the center of the second focus detecting area group different from each other according to the object detection result by the object detector 130.

Since the area on which the user wishes to focus is often the pupil in the case of a person, in this embodiment, the camera MPU 125 sets the vertical defocus map (second focus detecting area group) centered on the pupil detecting area 1803 in FIG. 18C, for example. However, this embodiment is not limited to this example.

The camera MPU 125 may change at least one of the first focus detecting area group and the second focus detecting area group according to the object detection result by the object detector 130 and the area designated by the user. For example, the object detector 130 may detect the first detecting area (the entire detecting area) of the object, and the camera MPU 125 may arrange the first focus detecting area group so as to include the center of the first detecting area, and arrange the second focus detecting area group so as to include the area designated by the user. Due to this configuration, in a case where the user wishes to focus on an area other than the pupil (e.g., a person's hands, feet, etc.), the arrangement of the second focus detecting area group can be changed according to the area designated by the user. Alternatively, the arrangement of the second focus detecting area group may be changed according to the setting by the user such as an imaging mode and an imaging scene. Thereby, focus detection can be performed properly according to the user's intent.

In this embodiment, the camera MPU 125 may change the first focus detecting area group as well as the second focus detecting area group according to the object detection result. Alternatively, the camera MPU 125 may change only the first focus detecting area group according to the object detection result. In other words, the camera MPU 125 may change at least one of the first focus detecting area group and the second focus detecting area group so that the center of the first focus detecting area group and the center of the second focus detecting area group are different from each other, according to the object detection result.

This embodiment can properly arrange defocus maps with different focus detecting directions with respect to an object, and select a defocus amount of the object. Therefore, this embodiment can provide a control apparatus, an image pickup apparatus, a control method, and a storage medium, each of which can perform proper focus detection in accordance with the object detection result.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that the disclosure is not limited to the example embodiments. The scope of the following claims is to be accorded the broadest interpretation so as to encompass all such modifications and equivalent structures and functions.

This embodiment can provide a control apparatus that can provide a proper focus detection according to an object detection result.

This application claims priority to Japanese Patent Application No. 2024-087264, which was filed on May 29, 2024, and which is hereby incorporated by reference herein in its entirety.

What is claimed is:

1. A control apparatus comprising:

at least one processor that executes instructions to:

- perform a first focus detection based on a first signal obtained from a pair of pixels arranged on an image sensor in a first direction,
- perform a second focus detection based on a second signal obtained from a pair of pixels arranged on the image sensor in a second direction different from the first direction,
- detect an object based on an image signal obtained from the image sensor,
- determine a first focus detecting area group for the first focus detection and a second focus detecting area group for the second focus detection, and
- change at least one of the first focus detecting area group and the second focus detecting area group according to an object detection result.

2. The control apparatus according to claim 1, wherein the number of first focus detecting areas included in the first focus detecting area group is larger than the number of second focus detecting areas included in the second focus detecting area group.

3. The control apparatus according to claim 1, wherein a density of second focus detecting areas included in the second focus detecting area group is higher than a density of first focus detecting areas included in the first focus detecting area group.

4. The control apparatus according to claim 1, wherein the processor is configured to:

- detect a first detecting area of the object and a second detecting area which is smaller than the first detecting area,
- arrange the first focus detecting area group so as to include a center of the first detecting area, and
- arrange the second focus detecting area group so as to include a center of the second detecting area.

5. The control apparatus according to claim 1, wherein in a case where the processor detects both a first detecting area of the object and a second detecting area smaller than the first detecting area, the processor is configured to:

- arrange the first focus detecting area group so as to include a center of the first detecting area, and
- arrange the second focus detecting area group so as to include a center of the second detecting area.

6. The control apparatus according to claim 1, wherein in a case where the processor detects one of a first detecting area of the object and a second detecting area smaller than the first detecting area, the processor is configured to:

- arrange the first focus detecting area group and the second focus detecting area group so as to include either a center of a detected first detecting area or a center of a detected second detecting area.

7. The control apparatus according to claim 1, wherein the processor is configured to make a center of the first focus detecting area group different from a center of the second focus detecting area group.

8. The control apparatus according to claim 1, wherein the processor is configured to change at least one of the first focus detecting area group and the second focus detecting area group according to an area designated by a user.

9. The control apparatus according to claim 8, wherein the processor is configured to:

- detect a first detecting area of the object,
- arrange the first focus detecting area group so as to include a center of the first detecting area, and
- arrange the second focus detecting area group so as to include an area designated by the user.

10. An image pickup apparatus comprising:

- the control apparatus according to claim 1; and
- the image sensor.

11. The image pickup apparatus according to claim 10, wherein the image sensor includes a plurality of pixels configured to receive light beams that pass through different partial pupil regions in an imaging optical system.

12. The image pickup apparatus according to claim 11, wherein the plurality of pixels includes the pair of pixels arranged in the first direction and the pair of pixels arranged in the second direction.

13. The image pickup apparatus according to claim 12, wherein the first direction is a horizontal direction of the image pickup apparatus, and

- wherein the second direction is a vertical direction of the image pickup apparatus.

14. A control method comprising:

performing a first focus detection based on a first signal obtained from a pair of pixels arranged on an image sensor in a first direction, performing a second focus detection based on a second signal obtained from a pair of pixels arranged on the image sensor in a second direction different from the first direction, detecting an object based on an image signal obtained from the image sensor, determining a first focus detecting area group for the first focus detection and a second focus detecting area group for the second focus detection, and changing at least one of the first focus detecting area group and the second focus detecting area group according to an object detection result.

15. A non-transitory computer-readable storage medium storing a computer program that causes a computer to execute the control method according to claim 14.

* * * * *